(12) United States Patent
Chen et al.

(10) Patent No.: US 7,120,279 B2
(45) Date of Patent: *Oct. 10, 2006

(54) METHOD FOR FACE ORIENTATION DETERMINATION IN DIGITAL COLOR IMAGES

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 473 days.

This patent is subject to a terminal disclaimer.

(21) Appl. No.: 10/354,837

(22) Filed: Jan. 30, 2003

(65) Prior Publication Data

US 2004/0151371 A1   Aug. 5, 2004

(51) Int. Cl.
   *G06K 9/00*   (2006.01)
(52) U.S. Cl. ........................... 382/118; 382/164
(58) Field of Classification Search ............... 382/118, 382/164

See application file for complete search history.

(56) References Cited

U.S. PATENT DOCUMENTS

| | | | |
|---|---|---|---|
| 5,430,809 A | 7/1995 | Tomitaka | 382/173 |
| 5,629,752 A | 5/1997 | Kinjo | 355/35 |
| 5,835,616 A | 11/1998 | Lobo et al. | 382/118 |
| 5,982,912 A | 11/1999 | Fukui et al. | |
| 6,421,463 B1 * | 7/2002 | Poggio et al. | 382/224 |
| 6,940,545 B1 * | 9/2005 | Ray et al. | 348/222.1 |
| 2001/0036298 A1 * | 11/2001 | Yamada et al. | 382/118 |
| 2002/0102024 A1 * | 8/2002 | Jones et al. | 382/225 |
| 2003/0108244 A1 * | 6/2003 | Li et al. | 382/227 |
| 2003/0133613 A1 * | 7/2003 | Ono | 382/209 |
| 2004/0013304 A1 * | 1/2004 | Viola et al. | 382/224 |
| 2005/0013479 A1 * | 1/2005 | Xiao et al. | 382/159 |

FOREIGN PATENT DOCUMENTS

EP   WO 99/23600 A   5/1999

OTHER PUBLICATIONS

Jeon et al., Face Detection Using the 1st-Order RCE Classifier, IEEE ICIP, 2002.*
Rowley et al., Rotation Invariant Neural Network-Based Face Detection, IEEE, 1998.*
Liu, Z; Wang, Y; "Face Detection and Tracking in Video Using Dynamic Program", International Conference on Image Processing Proceedings, vol. 1 p. 53-56, 2000.*

(Continued)

*Primary Examiner*—Joseph Mancuso
*Assistant Examiner*—Jordan Kuhn
(74) *Attorney, Agent, or Firm*—David M. Woods

(57) ABSTRACT

A digital image processing method for determining an orientation of a face in a digital color image generates a mean grid pattern element image from a plurality of sample face images and an integral image from the digital color image. A face is located in the color digital image by using the integral image to perform a correlation test between the mean grid pattern element image and the digital color image at a plurality of effective resolutions by reducing the digital color image to a plurality of grid pattern element images at different effective resolutions and correlating the mean grid pattern element image with the plurality of grid pattern element images, whereby either the mean grid pattern element image or the grid pattern element images are provided at a plurality of different orientations. Accordingly, an orientation of the face in the color digital image is determined by using the images with different orientations in the correlation test.

29 Claims, 18 Drawing Sheets

OTHER PUBLICATIONS

Yang et al., "Human Face Detection in a Complex BAckground", Pattern Recognition, vol. 27, No. 1, 1994, pp. 53-63.*

Viola et al., "Robust Real-time Object Detection", Second International Workshop on Statistical and Computational Theories of Vision, Jul. 2001, pp. 1-25.*

Zhu et al., "A Cascaded Face Detection Framework", Signal and Image Processing, 2003.*

Sobottka et al., "Face Localization and Facial Feature Extraction Based on Shape and Color Information", IEEE, 1996.*

Sung et al., "Example-Based Learning for View-Based Human Face Detection", IEEE Transactions on Pattern Analysis and Machine Intelligence, vol. 20 No. 1, Jan. 1998.*

Wang, "A Highly Efficient System for Automatic Face Region Detection in MPEG Video", IEEE Transactions on Circuits and Systems for Video Technology, vol. 7 No. 4, Aug. 1997.*

Turk et al., "Eigenfaces for Recognition", Journal of Cognitive Neuroscience, vol. 3 No. 1, 1991.*

Ando et al., "Human Face Detection and Recognition using Principle Coponent Analysis", Hiroshima University, 2003.*

Saber et al., "Face Detection an Facial Feature Extraction Using Color, Shape and Symmetry-Based Cost Function", Proceedings of ICPR '96, 1996.*

U.S. Appl. No. 10/211,011, Chen et al.

"Human Face Detection in a Complex Background" by Guangzheng Yang and Thomas S. Huang. Pattern Recognition, vol. 1, pp. 53-63, 1994.

*The Statistical Analysis of Time Series* by T.W. Anderson. Chapter 6. John Wiley & Sons, Inc. 1994.

"Robust real-time object detection" by Paul Viola et al., *Proceedings of ICCV 2002*.

"A Novel Algorithm for Rotated Human Face Detection" by Xioguang Lv, Jie Zhou, Chang-shui Zhang. Proceedings of International Conference on Computer Vision and Pattern Recognition, 2000.

Anderson, T.W., "The Statistical Analysis of Time Series", Chapter 6, Serial Correlation, Wiley-Interscience Publication, 1994, pp. 254-357.

Viola et al., "Robust Real-Time Object Detection", Second International Workshop on Statistical and Computational Theories of Vision, Jul. 2001, pp. 1-25.

Yang et al., "Human Face Detection in a Complex Background", Pattern Recognition, vol. 27, No. 1, 1994, pp. 53-63.

Zhu Liu et al., "Face Detection and Tracking In Video Using Dynamic Programming", Image Processing, 2000, Proceedings 2000, International Conference On Sep. 10-13, 2000, Piscataway, NJ, USA, IEEE, vol. 1, Sep. 10, 2000, pp. 53-56 XP010530548, ISBN: 0-7803-6927-7.

U.S. Appl. No. 10/211,011, filed Aug. 2, 2002, "Method for Locating Faces In Digital Color Images", Shoupu Chen et al.

* cited by examiner

METHOD FOR FACE ORIENTATION DETERMINATION IN DIGITAL COLOR IMAGES

CROSS-REFERENCE TO RELATED APPLICATION

Reference is made to commonly assigned copending application Ser. No. 10/211,011, entitled "Method for Locating Faces in Digital Color Images" and filed 2 Aug. 2002 in the names of Shoupu Chen and Lawrence A. Ray, and which is assigned to the assignee of this application.

FIELD OF THE INVENTION

The present invention relates to digital image processing methods for automatically finding human face orientations.

BACKGROUND OF THE INVENTION

In digital image processing and, in particular, image processing for the purpose of enhancing and optimizing the process of image capture by a camera, it is often useful to automatically detect human faces. Applications of face detection include face recognition, image beautification, image scene balancing, image retrieval, security surveillance and personal identification.

A preponderance of images collected by photographers contain human facial images, which are often the most important subjects of the images. Knowledge of the presence and location of faces in an image could enable many beneficial improvements to be made in the image capture process. Some are suggested in the prior art. For example, automatic and semi-automatic focusing cameras often pick a portion of the scene on which to adjust for best focus. If the camera could locate the faces in a scene, then focus could be optimized for the faces unless the photographer explicitly overrides that choice. In U.S. Pat. No. 5,835,616 a face detection system is used in automated photography to eliminate manual adjustment problems that can result in poor quality from lack of focused subjects.

Furthermore, detection of the faces in a scene gives very strong evidence of the proper location of the principal subject matter. In that connection, the process disclosed in the '616 patent automatically finds a human face in a digitized image taken by a digital camera, confirms the existence of the face by examining facial features and then has the camera automatically center itself on the detected face. Detection of a face also yields strong evidence of proper color balance for the facial and/or skin area. For example, in U.S. Pat. No. 5,430,809 a video camera autonomously tracks a facial target in order to set a measuring frame on the facial object for purpose of auto exposure and auto focus. In addition, once the measuring frame is set, an auto white balance system adjusts colors to obtain optimal skin color on the face. As a result, the auto white balance system is said to perform auto skin color balance. It is also known (from U.S. Pat. No. 5,629,752) to detect a human face and then to utilize data representing color and/or density of the facial region to determine an exposure amount such that the region corresponding to the face can be printed appropriately by a photographic printer.

A great amount of research effort has been spent on proposing a wide variety of face detection techniques. Face detection is defined as locating the existence of a face in an image. Face recognition on the other hand is defined as assigning an identity to a detected face. Face detection is often a precursor to face recognition. In general, prior art face detection techniques can be classified as either feature-based or region-based. The techniques in the feature-based category first derive low level features such as edges and then use face knowledge-based analysis to find face candidates in an image. The apparent properties of the face such as skin color and face geometry are exploited at different system levels in this category. Feature-based approaches have dominated face detection research interest for a quite long period before the recent shift of interest to using pattern recognition theory in face detection. It is worth noting that the main components used in the feature-based techniques are edges that come from a high frequency portion of the image; in general, such components are not as stable as components from a low frequency portion. Also, in using skin color for face detection, most techniques employ carefully designed skin color models in order to achieve high skin detection accuracy with very low false positive occurrence. However, skin color models having a high degree of accuracy often tend to exclude skin colors falling outside of the majority skin color region upon which skin color models are built. The exclusion of non-majority skin colors, in turn, results in face detection failures.

In recent years, benefiting from the advances in pattern recognition theory, techniques in the region-based category treat face detection as a pattern recognition problem without the application of face knowledge. The performance of the methods in this category relies solely on the quality of a classifier trained by learning examples from face class and non-face class training images. The number of samples of face and non-face (or the variation of training images) used in the training process largely determines the effectiveness of the classifier. More training images result in better classifiers. It is a commonly accepted understanding that, while the number of face training images may have a limit, the number of non-face training images has no limit. Thus, repeated training is not uncommon for techniques in this category. Huge footprints (memory spaces required to store trained classifier information in a computer to do the face detection task) may result, which may become a problem for applications with limited computing resources. It should also be noted that face structural (geometry) information is basically not used in techniques in this category.

While face detection has been studied over the past several years in relation to the subject of image understanding, it remains an area with impressive computational requirements, particularly if a robust face detection algorithm is needed. A number of methods have been devised that show reasonable performance over a range of imaging conditions. For example, in a recent article (*Human Face Detection in A Complex Background*, published in Pattern Recognition, Vol. 1, pp. 53–63, 1994), Guangzheng Yang and Thomas S. Huang proposed a hierarchical knowledge-based method to locate human faces in an image. Such methods may be more successfully implemented in large scale processing equipment, such as photographic printers, which have relatively sophisticated processing capability (compared to a hand-held camera). The challenge is to implement these face detection methods reasonably in a camera with limited memory resources, and with low computational cost (rapid execution). If this can be done successfully, the detection of faces in a scene will then serve as a springboard to numerous other improvements in the image capture process.

In addition, it would be useful to detect face orientations in order to implement downstream activities after image capture, e.g., face detection could provide evidence of up/down orientation for subsequent printing (for example, of index prints). Therefore, face orientation determination is as important as face detection in automatic processing of digital images. In a recent publication ("A novel algorithm for rotated human face detection", in the *Proceedings of International Conference on Computer Vision and Pattern Recognition,* 2000) Lv et al. proposes a framework to detect human faces rotated within an image plane. In that method, an orientation histogram of an image is first constructed using local orientation analysis. Using a statistical orientation feature, the rotation angle of a supposed face image is found. Then the supposed face image is rotated accordingly and an upright face detection system is applied to the image. The assumption is that an image window under consideration contains a single face. A major problem with method is that the orientation detected is a collinear orientation, which means that if two orientations are collinear (i.e. the difference between them is 180 degrees), they should be considered as the same orientation. Thus, this system cannot differentiate, for example, an upright face image from an upside down face image, which is a very much needed feature for many applications, such as an automatic image editing system.

There is a need therefore for an improved face detection method that overcomes the problems set forth above in relation to orientation.

SUMMARY OF THE INVENTION

The need is met according to the present invention by providing a digital image processing method for determining an orientation of a face in a digital color image by generating and using a mean grid pattern element image from a plurality of sample face images and an integral image from the digital color image. A face is located in the color digital image by using the integral image to perform a correlation test between the mean grid pattern element image and the digital color image at a plurality of effective resolutions by reducing the digital color image to a plurality of grid pattern element images at different effective resolutions and correlating the mean grid pattern element image with the plurality of grid pattern element images, whereby either the mean grid pattern element image or the grid pattern element images are provided at a plurality of different orientations. Accordingly, an orientation of the face in the color digital image is determined by using the images with different orientations in the correlation test.

In another aspect of the invention, a face is located in a digital image by a) generating a mean grid pattern element image from a plurality of sample face images by obtaining a mean face image from the plurality of sample face images, dividing the mean face image into a grid pattern comprising a plurality of cells, and forming the mean grid pattern element image from a mean value of each cell; b) generating a grid pattern element image from a region of the digital color image that possibly contains a face; and c) locating a face in the color digital image by performing a correlation test between the mean grid pattern element image and the grid pattern element image at a plurality of different image orientations, whereby either the mean grid pattern element image or the grid pattern element image is provided at the plurality of different orientations.

In yet another aspect of the invention, a face is located in a digital image by a) generating a mean grid pattern element image from a plurality of sample face images by obtaining a mean face image from the plurality of sample face images, dividing the mean face image into a grid pattern comprising a plurality of cells, and forming the mean grid pattern element image from a mean value of each cell; b) generating an integral image from the digital color image; and c) locating a face in the color digital image by using the integral image to perform a correlation test between the mean grid pattern element image and the digital color image at a plurality of effective resolutions by reducing the digital color image to a plurality of grid pattern element images at different effective resolutions and correlating the mean grid pattern element image with the plurality of grid pattern element images, whereby either the mean grid pattern element image or the grid pattern element images are provided at a plurality of different orientations.

These and other aspects, objects, features and advantages of the present invention will be more clearly understood and appreciated from a review of the following detailed description of the preferred embodiments and appended claims, and by reference to the accompanying drawings.

ADVANTAGES

The present invention has the advantages of rapid execution and requiring very little memory space in order to locate faces in different orientations in a digital image.

DETAILED DESCRIPTION OF THE INVENTION

Figure 1:
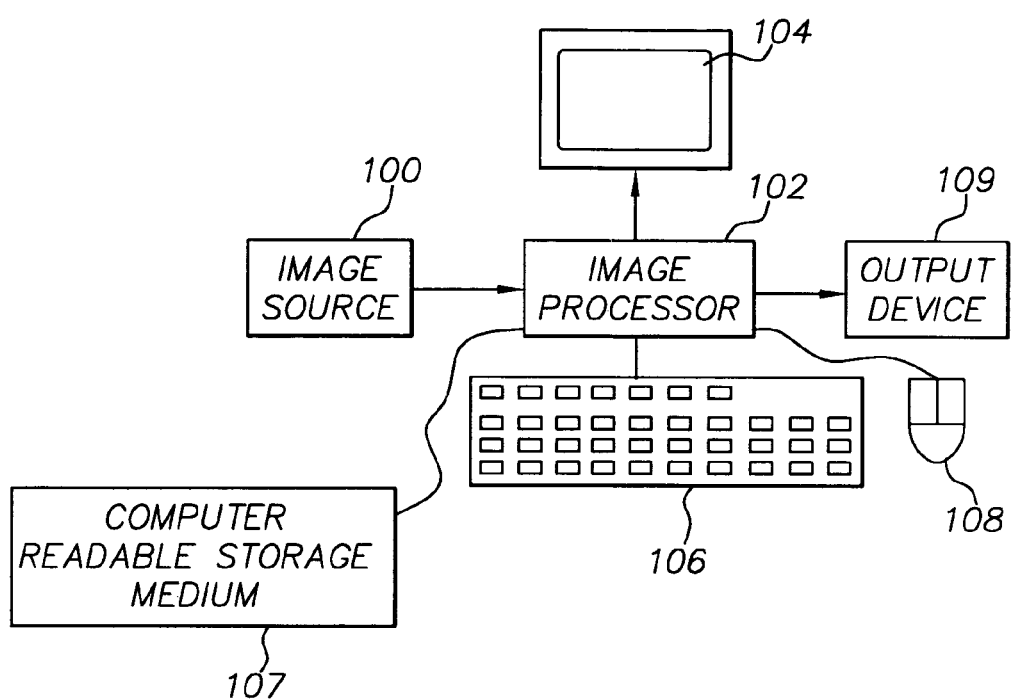
FIG. 1 is a schematic diagram of an image processing system useful in practicing the present invention.

FIG. 1, which shows an image processing system useful in practicing the present invention, includes a color digital image source 100, such as a film scanner, a digital camera, or a digital image storage device (e.g., such as a compact disk drive for playing images stored on a Picture CD). The digital image from the digital image source 100 is provided to an image processor 102, such as a programmable personal computer, or a digital image processing work station such as a Sun Sparc workstation. The image processor 102 may be connected to a CRT display 104, an operator interface such as a keyboard 106 and a mouse 108. The image processor 102 is also connected to a computer readable storage medium 107. The image processor 102 transmits processed digital images to an output device 109. The output device 109 can comprise a hard copy printer, a long-term image storage device, a connection to another processor, or an image telecommunication device connected, for example, to the Internet.

In the following description, a preferred embodiment of the present invention will be described as a method. However, the present invention may also comprise a computer program product for detecting human faces in a digital image in accordance with the method described. In describing the present invention, it should be apparent that the computer program of the present invention can be utilized by any well-known computer system, such as the personal computer of the type shown in FIG. 1. However, many other types of computer systems can be used to execute the computer program of the present invention. For example, the method of the present invention can be executed in a computer contained in a digital camera. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on a computer readable storage medium that is connected to the image processor by way of the Internet or other communication medium. Those skilled in the art will readily recognize that the equivalent of such a computer program product may also be constructed in hardware.

Figure 2:
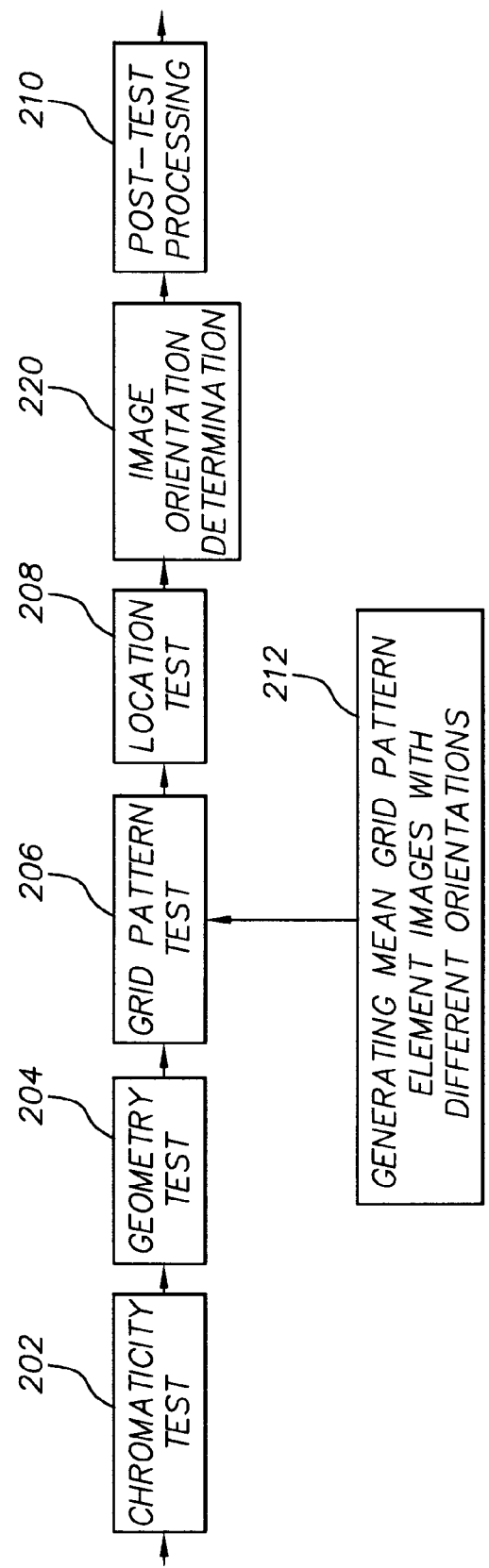
FIG. 2 is a flowchart illustrating the face detection method of the present invention.

Turning now to FIG. 2, the method of the present invention will be outlined. FIG. 2 is a flow chart illustrating one embodiment of the face detection method of the present invention. In the embodiment shown in FIG. 2, an input color digital image goes through a set of cascaded tests. Each of these tests discards non-face objects with high confidence and retains most faces. The idea is to maintain a very high true-positive detection rate in every cascaded test while keeping a relatively low false-positive rate for individual tests. Since tests are cascaded, an overall performance of high true-positive and low false-positive rates is achieved. In the present invention, face detection tasks are distributed to different types of tests. This distributed system approach reduces the burden on each individual test, thereby, speeding up the detection process.

In the embodiment shown in FIG. 2, there are basically four cascaded tests. A chromaticity test 202 discards, with high confidence, non-skin-color pixels in the input digital color image. This chromaticity test is different from the traditional skin color detection methods. In using a color property for face detection, most skin color detection techniques employ carefully designed skin color models in order to achieve high skin detection accuracy with very low false positives. However, skin color models having a high degree of accuracy often tend to exclude skin colors falling outside of the skin color region of a majority population upon which skin color models are built. The exclusion of non-majority skin colors, in turn, results in face detection failures. This chromaticity test, instead, focuses on exclusion of non-skin-colors with high accuracy. For example, it discards (sets to black) saturated green, or saturated blue pixels, and keeps pixels having colors close to skin-colors of all hues. Therefore, it does not reject skin color pixels of non-majority populations.

The chromaticity test 202 is followed by a geometry test 204. Pixels retained in the chromaticity test step 202 are grouped into regions (or clusters of pixels). These regions are checked to see if they pass a geometry test. Only those regions that pass the test will be allowed to enter a subsequent statistical test, that is, a grid pattern test 206; all other pixels are set to black. The geometry test 204 basically checks a region's geometric shape, size, and location.

After the first two tests (chromaticity test 202 and geometry test 204), regions (or clusters of pixels) possibly containing faces remain and are further checked to locate actual positions of faces. The grid pattern test 206 performs the task of locating actual faces with the help of a mean grid pattern element image that is formed in a mean grid pattern element image generator 212. The grid pattern test 206 performs a similarity check by evaluating a correlation coefficient between the mean grid pattern element image and a grid pattern element image generated from a sub-image that is cropped from the remaining regions obtained from the geometry test step 204. Sub-images that pass the grid pattern test 206 are marked as candidate faces and assigned an orientation index. Some candidates may reside partially in regions discarded in the geometry test 204.

All candidates are subsequently checked in a location test 208. Candidates residing partially in regions discarded in the geometry test 204 are unmarked in the location test 208. The grid pattern test 206 is performed on the image in a raster scan fashion. Raster scanning, however, may result in multiple candidates very close to each other in terms of position for the same face. Post-test processing 210 is then performed to combine closely spaced multiple candidates into a single candidate based on a distance measure. Every one of the resultant candidates is given an orientation index. The image orientation is thus determined in an image orientation determination stage 220 based on the candidates' orientation indices.

Figure 4A:
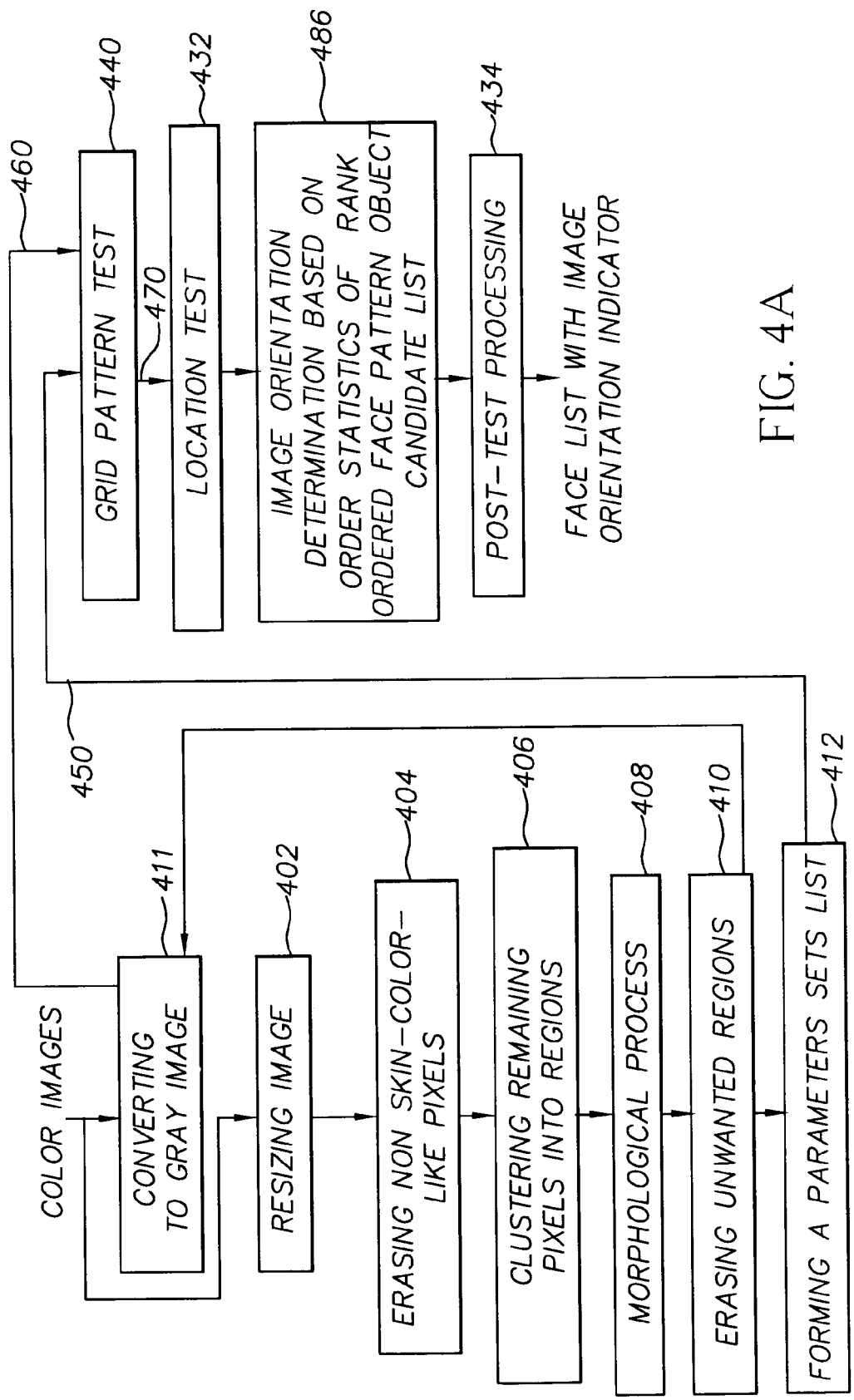
FIG. 4A is a flowchart illustrating a detailed process of orientation determination according to the present invention.
Figure 4B:
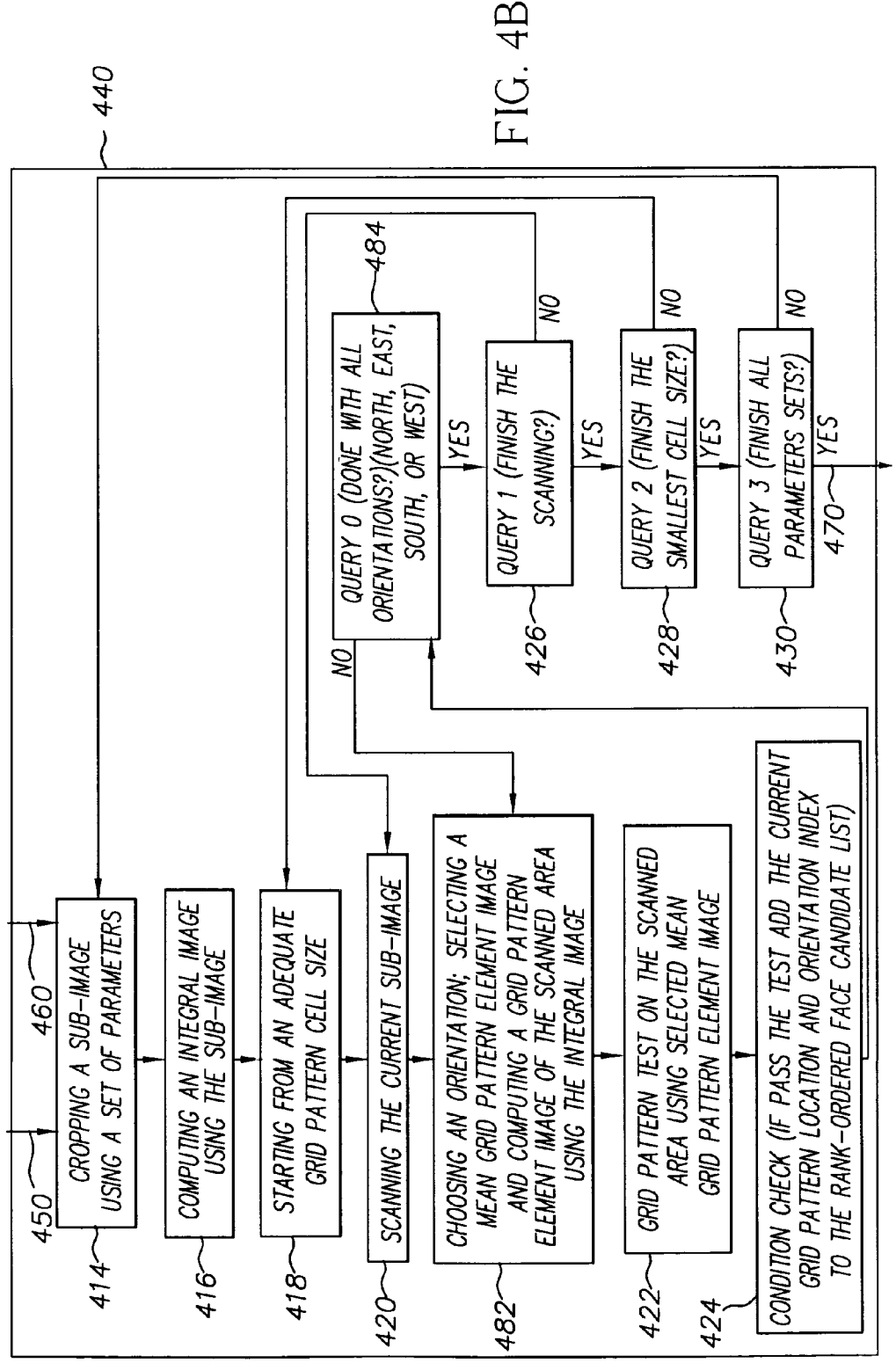
FIG. 4B is a flowchart illustrating a detailed process of mean grid pattern testing for face orientation determination, as used in the process shown in FIG. 4A.
Figure 12A:
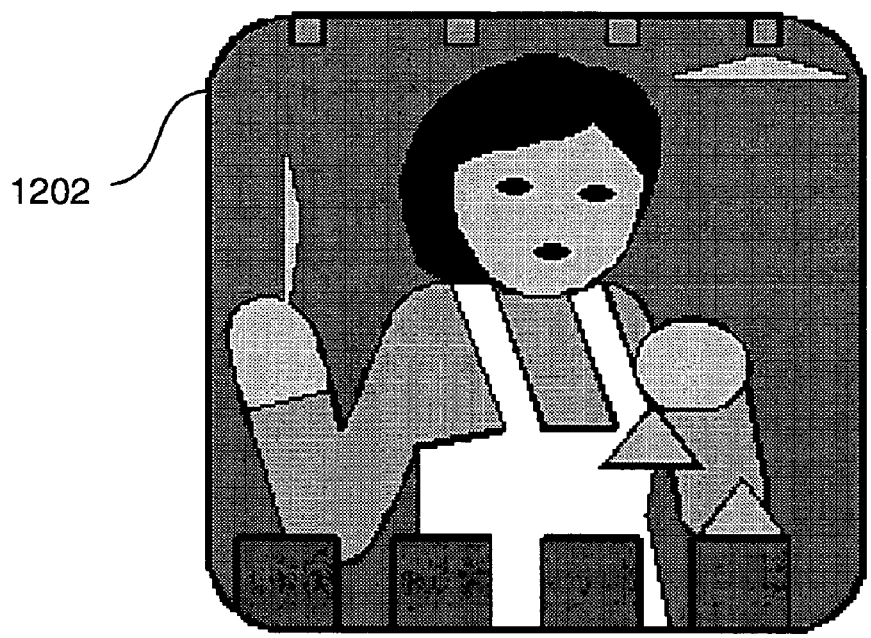
FIGS. 12A, 12B, 12C and 12D are illustration useful in describing an image, a skin test and a geometry test and the definition of a box for a skin color cluster respectively.
Figure 12B:
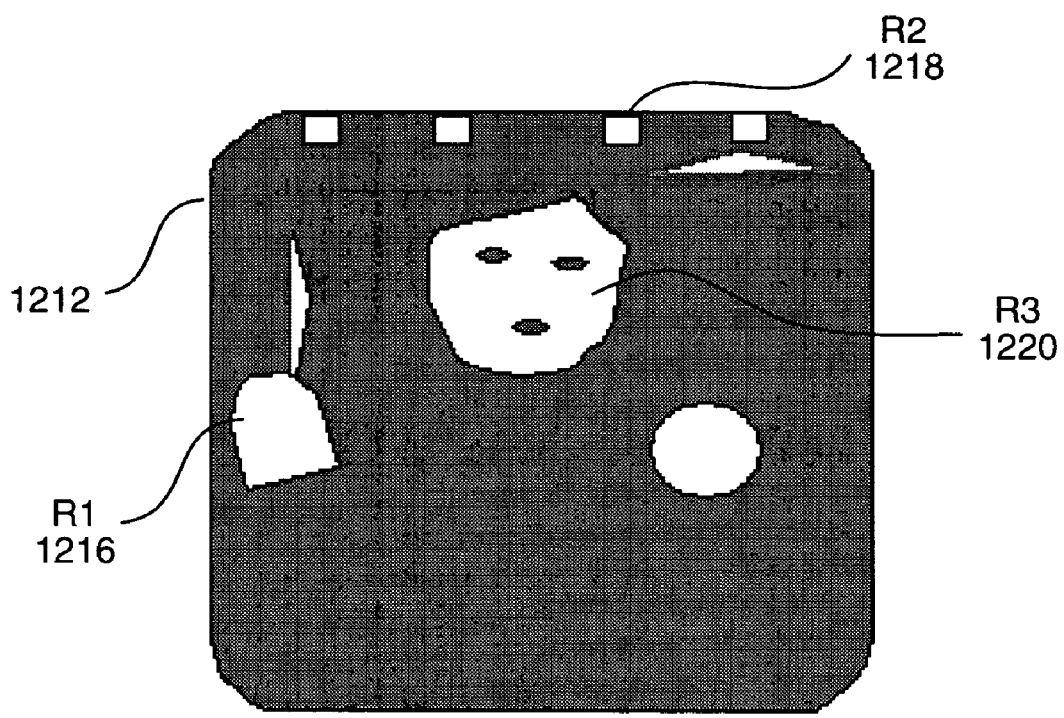

Referring now to FIGS. 4A and 4B, the method of the present invention is described in greater detail as a flow chart illustrating further detail of what is shown in FIG. 2. In the embodiment shown in FIG. 4A, an input image having a standard size may first be resized downward in a resizing image down step 402. This step is optional to increase the processing speed of the method. An exemplary standard size input image could be 384×256 pixels. An exemplary resizing factor is 4. The purpose of resizing downward of the input image is to speed up the processes of the chromaticity test 202 and the geometry test 204. The resized color image is processed in an erasing non-skin-color pixels step 404 (referred to as a chromaticity test 202 in FIG. 2) to get rid of non-skin-color pixels. The non-skin color pixels are set to black. Unlike traditional skin color detection algorithms, this chromaticity test has neither color space conversion nor skin color modeling. In the present invention, if a pixel satisfies a set of conditions, it will be marked as a non-skin-color pixel. The erasing procedure and associated exemplary conditions are described by a piece of pseudo code in Equation (1) where rowsnew and colsnew are the height and width of the resized image; r, g, b are three color components of a pixel, Rgratio1, Rbratio1, Rgratio2, and Rbratio2 are predefined coefficients, and Rt, Gt and Bt are absolute values used as predefined thresholds. Exemplary values for the predefined coefficients could be Rgratio1=1.1, Rbratio1=1.1, Rgratio2=3.5, and Rbratio2=5.0. These coefficients can be determined empirically by examining red-green and red-blue ratios of the face regions of a large quantity of sample images. Exemplary values for the predefined thresholds could be Rt, Gt, Bt=about 10 to 20 (code values in an 8 bit system). If a pixel meets these conditions, that fact is noted by setting one of the pixel's channels to zero (e.g., g[i]=0), which is then keyed on to set the pixel to black. FIGS. 12A–D show an example of a chromaticity test. In FIG. 12A, there is an intensity color image 1202. In FIG. 12B, there is a first binary image 1212 that is the result after applying Equation (1) to the intensity image 1202. In the first binary image 1212, a pixel in dark represents a non-skin-color pixel in the intensity image 1202, while a pixel in white represents a skin-color pixel in the intensity image 1202.

```
for(i = 0; i < rowsnew * colsnew; i + +) {
   if(r[i] < Rgratio1 * g[i] || r[i] < Rbratio1 * b[i])
      || r[i] < Rt || g[i] < Gt || b[i] < Bt || r[i] > RGratio2 * g[i] ||
      r[i] > RBratio2 * b[i] {                                         (1)
      g[i] = 0;
   }
}
```

Figure 12C:
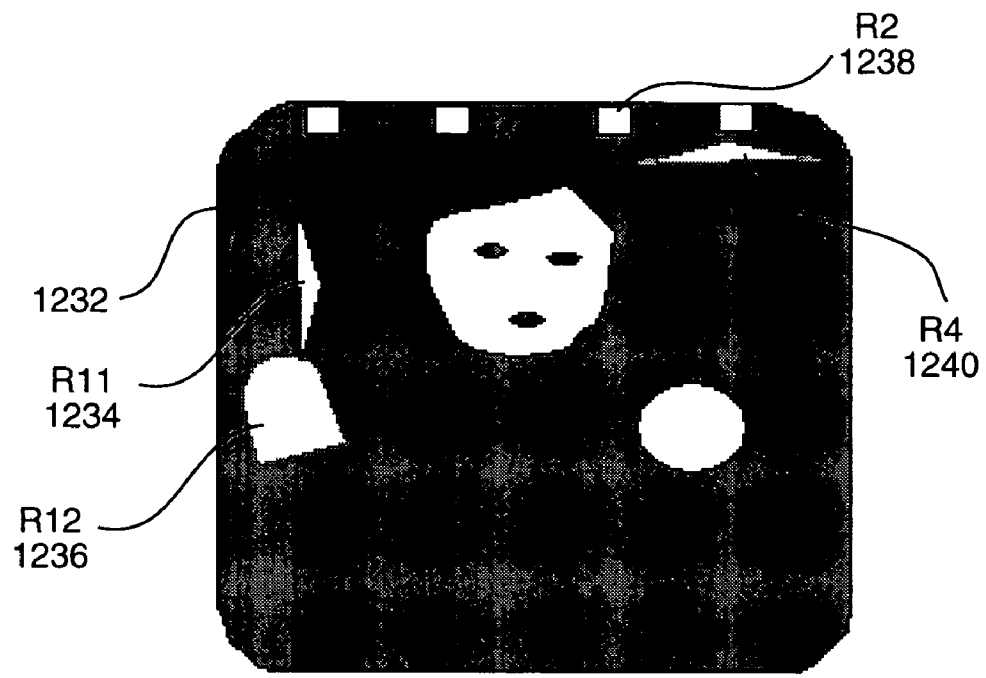

Now, referring back to FIG. 4A, there are three steps (step 406 of clustering remaining pixels into regions, step 408 of morphological processing, and step 410 of erasing unwanted regions) responsible for implementing the geometry test 204. To better explain the test operation, example images in FIGS. 12B and 12C are referred to. An input image to the step 406 of clustering remaining pixels into regions is a binary image obtained from the chromaticity test 202 in FIG. 2 (or the step 404 of erasing non-skin-color pixels in the more detailed flow chart shown in FIG. 4A). An example binary image is shown in the upper right part of FIG. 12B. Non-zero pixels in the first binary image 1212 are grouped into clusters. By definition, a cluster is a non-empty set of non-black pixels with the property that any pixel within the cluster is also within a predefined distance to another pixel in the cluster. An exemplary predefined distance is 1 pixel of the resized image. Example clusters in the first binary image 1212 are cluster R1 (1216), cluster R2 (1218), and cluster R3 (1220). An interesting point is that cluster R1 (1216) is a combination of two barely touching clusters. After applying the morphological processing step 408 to the pixel clusters, cluster RI (1216) in the binary image 1212 breaks into two clusters R11 (1234) and R12 (1236) in a second binary image 1232 (FIG. 12C). A preferred morphological process is an opening/closing operation. The morphological operation in the geometry test step is implemented by evaluating the 8-connected neighbors of a non-zero pixel and deleting this pixel if the number of zero valued neighbors exceeds a threshold. The currently used threshold, $T_M$, is 5 and threshold is adjustable from application to application.

A final step in the geometry test 204 is the step 410 of erasing unwanted clusters step. Unwanted clusters are those clusters satisfying one or more of the following conditions: (1) the maximum width of a cluster is smaller than a predefined minimum width; (2) the maximum height of a cluster is smaller than a predefined minimum height; (3) the center of a cluster is within a minimum margin of the image boundary. An exemplary predefined minimum width is 3 pixels of the resized image. An exemplary predefined minimum height is 3 pixels of the resized image. An exemplary predefined minimum margin is 3 pixels of the resized image. Examples of clusters to be erased are cluster R2 (1238), cluster R11 (1234) and cluster R4 (1240) in the second binary image 1232 in FIG. 12C. The result of the step 410 of erasing unwanted clusters is a third binary image 1242 shown in FIG. 12D. Examples of remaining clusters are R3 (1244) and R12 (1246).

Referring to FIG. 2, the test after the geometry test 204 is the grid pattern test 206, which is also identified as test 440 in FIG. 4A. As shown in FIG. 4B, the grid pattern test 206 (440) starts from a step 414 of cropping a sub-image using a set of parameters and ends with a query 3 (430). An intensity image to be used in the grid pattern test 206 is a gray scale image converted from the original color image in a step 411 of converting to gray image shown in FIG. 4A. The parameters used in the cropping a sub-image step 414 are generated in a step 412 of forming a parameters sets list. A set of parameters contains a width, a height, and positions of an upper left corner of a rectangular box. The width of the box is a maximum width of a cluster retained in the geometry test 204, and the height of the box is a maximum height of a cluster retained in the geometry test 204. An example of such a box is a box 1248 shown in FIG. 12D. The positions of the upper left corner of the box are defined with respect to the upper left corner of the binary image 1242. It should be understood that these parameters are re-scaled to fit the original standard image size before they are used to crop a sub-image from the gray scale image in the step 414 of cropping a sub-image.

Figure 3A:
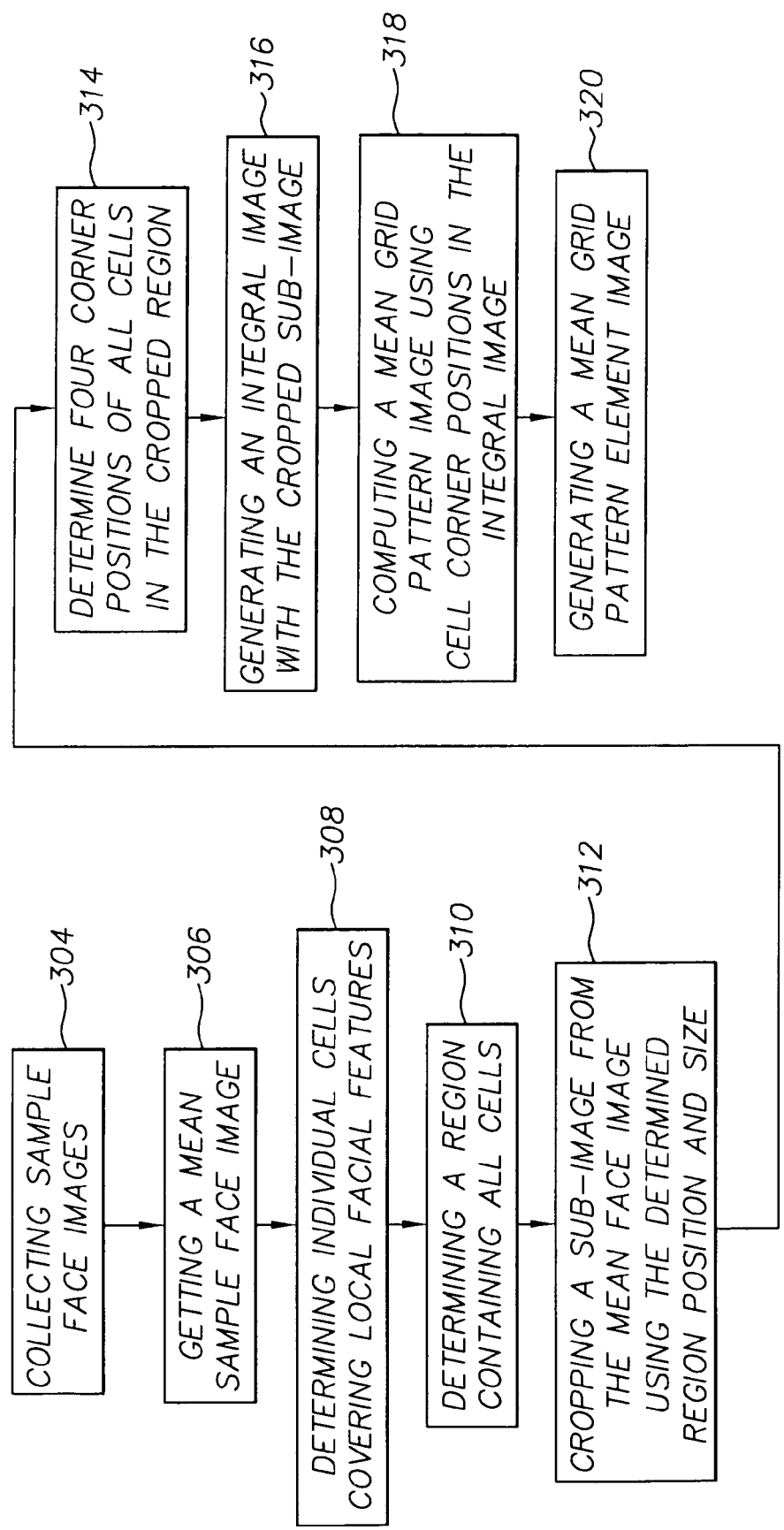
FIG. 3A is a flowchart illustrating a method of irregular grid pattern design.

The grid pattern test 206 uses a mean grid pattern element (MGPe) image generated in mean grid pattern element image generator 212. There are two designs for generating an MGPe image. Design 1 is a generalized design. Design 2 is a special case of design 1. The steps for implementing design 1 are described in FIG. 3A. A first step in design 1 is a step 304 of collecting sample face images. A large number of cropped face images are manually collected. In a step 306 of obtaining a mean face image, a mean face image is obtained by aligning two eyes of all the collected face images and taking an average intensity for every pixel. For the mean grid pattern element image. generator 212 to generate an MGPe image, the mean face image is divided into a grid pattern comprising a plurality of cells. Typically, for design 1, the grid cell sizes and positions are manually determined. In design 1, the grid pattern is irregular in that the cells have different sizes and each one of them covers a specific area of the face cluster (step 308 of determining individual cells covering local facial features). An example of such an irregular cell design (cell design 1) is shown in FIG. 5.

Figure 5:
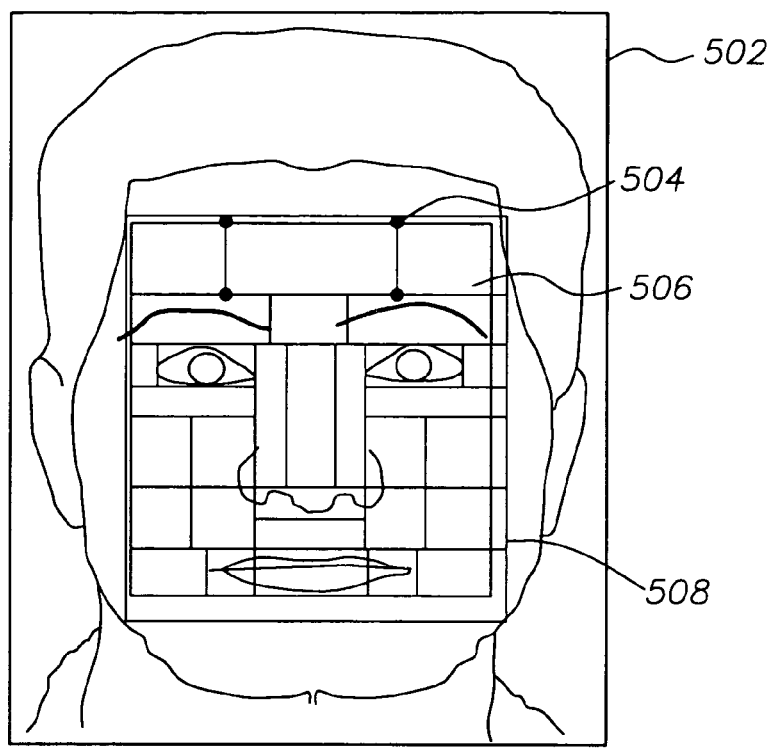
FIG. 5 is an illustration showing an irregular grid pattern.
Figure 11A:
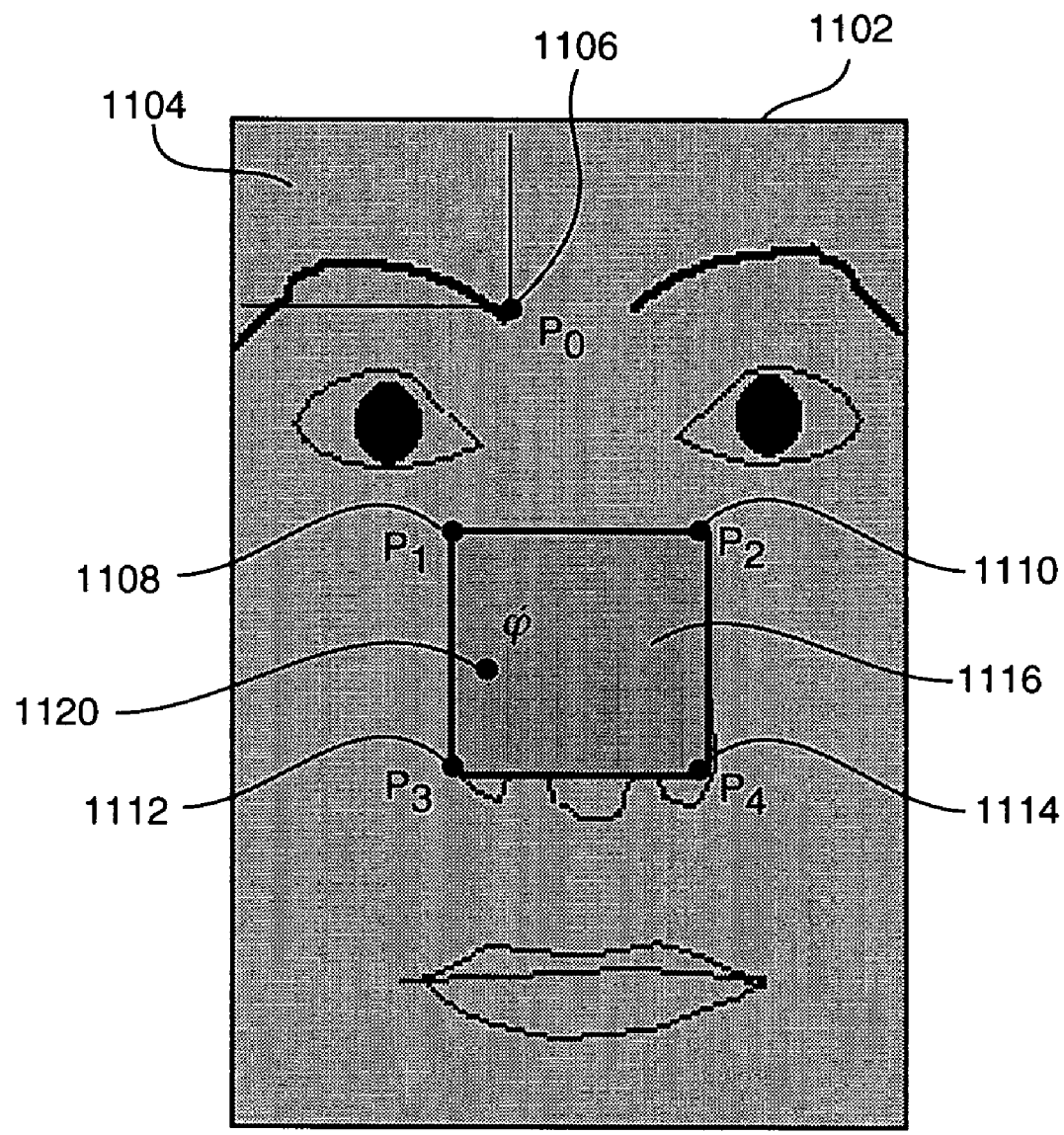
FIGS. 11A and 11B illustrate an intensity image and its associated integral image.
Figure 11B:
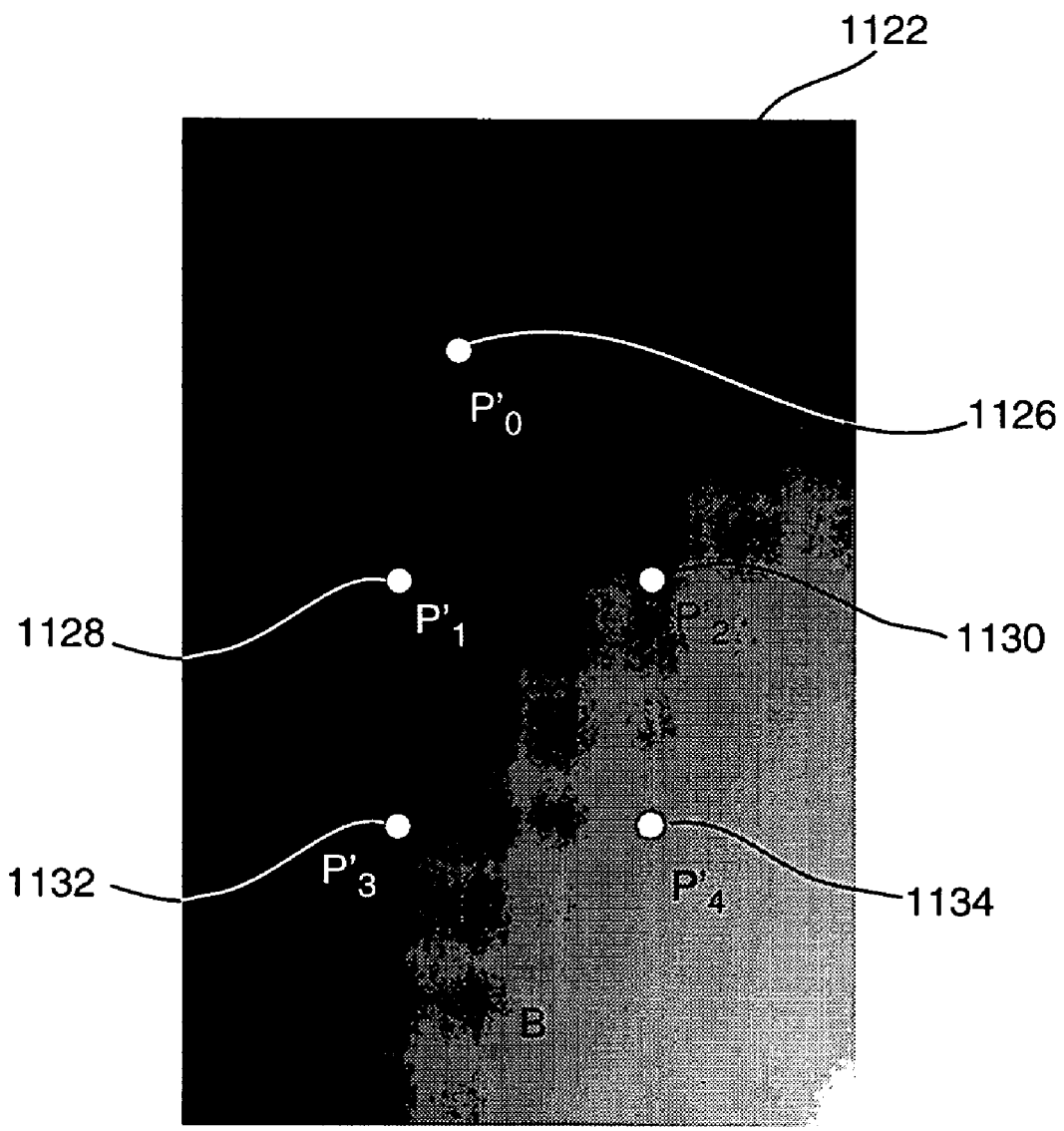

In a face image 502 as shown in FIG. 5, there is a cell 506 covering the forehead area. Other examples of cell design 1 can also be seen in FIG. 5. A smallest box that contains all the cells is determined in a step 310 of determining a box containing all cells. An example box 508 is shown in FIG. 5. Using this box, a sub-image of the mean face image can be obtained in a step 312 of cropping a sub-image. Four corner dots (position coordinates) such as an upper right corner dot 504 of the cell 506 are thereby calculated with respect to the upper left corner of the sub-image in a step 314 of determining four cell corner positions. An efficient approach to compute a mean grid pattern element image is to use an integral image (see "Robust real-time object detection", by Paul Viola et al., *Proceedings of ICCV* 2002, which is incorporated herein by reference and may be referenced for a detailed discussion of the calculation of an integral image). An example of calculating the integral image is shown in FIG. 11. In FIG. 11, image A (1102) is a gray level intensity image and image B (1122) is an integral image of image A (1102). The integral image has the same size as the mean face intensity image. The computation of a pixel 1126 in integral image B (1122) is $$B(p'_0) = \sum_{\|p_i\| \le \|p_0\|} A(p_i) \qquad (2)$$

where $A(p_i)|_{\|p_i\| \le \|p_0\|}$ defines a region 1104 in the mean face image 1102. $p_i$ is a vector in the two dimensional image plane which has an origin at the upper left corner. In the above case, $p_0 = p'_0$. In practice, Equation (2) is replaced by a pair of recurrences introduced in Viola's paper for speedy computation.

After obtaining an integral image in a step 316 of generating an integral image with the cropped sub-image, a mean grid pattern image is computed in a step 318 of computing a mean grid pattern image using cell corner positions in the integral image. It should be understood that the mean grid pattern image is different from the mean grid pattern element image. The mean grid pattern image has the same size as the mean face intensity image. The mean grid pattern element image is extracted from the mean grid pattern image. Now referring back to FIG. 11, there is a cell 1116 defined by four corner points $p_1$ (1108), $p_2$ (1110), $p_3$ (1112), and $p_4$ (1114). This cell covers a nose area of the mean face image. This cell also represents a cell in the same position in the mean grid pattern image to be computed from the mean face image. The computation of any pixels in this cell for the mean grid pattern image is expressed as $$\varphi = \frac{1}{mn}(B(p'_4) + B(p'_1) - B(p'_2) - B(p'_3))\bigg|_{\varphi \in \Phi[p_1, p_2, p_3, p_4]} \qquad (3)$$

where $\Phi[p_1,p_2,p_3,p_4]$ is the cell defined by four corner points $p_1$ (1108), $p_2$ (1110), $p_3$ (1112), and $p_4$ (1114) in the grid pattern image, $\Phi$ is any pixel in cell $\Phi[p_1,p_2,p_3,p_4]$, $B(p'_x)$ is the pixel value at positions $p'_x$ (they are $p'_1$ (1128), $p'_2$ (1130), $p'_3$ (1132), and $p'_4$ (1134)) in the integral image (here, $p_1 = p'_1$, $p_2 = p'_2$, $p_3 = p'_3$, and $p_4 = p'_4$), m is the cell height and n is the cell width. In this manner, the resolution of the mean face image is reduced to the resolution of the selected grid pattern by the averaging process expressed in equation (3).

Since all pixels in a cell have a same value, only one pixel for each cell (for example, $\Phi$ 1120 for the nose cell 1116 in FIG. 11) is needed to construct the mean grid pattern element image. For design 1, the format of the mean grid pattern element image could be a one dimensional image or a two dimensional image. A preferred format is the one dimensional image. For constructing the mean grid pattern element image, simply copy one pixel from each of the cells of the mean grid pattern image to a pixel in the mean grid pattern element image in an order. The number of pixels in the mean grid pattern element (MGPe) image equals the number of cells in the mean grid pattern image. The order of pixel copying process for this operation needs to be recorded so that in the grid pattern test 206 the same order can be used to form a grid pattern element image for images under testing if design 1 is selected.

In this invention, one of the four orientations (north, east, south, and west) of a face candidate is to be determined using the MGPe image. In the process of determination, the elements of the MGPe image generated in step 212 is reordered to form a new MGPe image with a different orientation. Or, four different MGPe images with different orientations can be pre-generated in step 212. In any case, denote the MGPe images with different orientations by $\Phi_0^i$, where $i \in [1,2,3,4]$. Denote a first orientation MGPe image by $\Phi_0^1$. An exemplary first orientation is shown in FIG. 5 when the face is upright. Denote a second orientation MGPe image by $\Phi_0^2$. An exemplary second orientation is clock-wise rotated first orientation. Denote a third orientation MGPe image by $\Phi_0^3$. An exemplary third orientation is upside down turned first orientation. Denote a fourth orientation MGPe image by $\Phi_0^4$. An exemplary fourth orientation is counter clock-wise rotated first orientation.

It is understood that since the mean grid pattern element (MGPe) image takes only one pixel from each of the cells, statistically, the size of the cropped sub-image (thereby, size of individual cells) should not matter. The MGPe image is simply a statistical measure of main features of a mean face. Practically, an exemplary size for the cropped sub-image for generating an MGPe image could be 105×105.

Figure 3B:
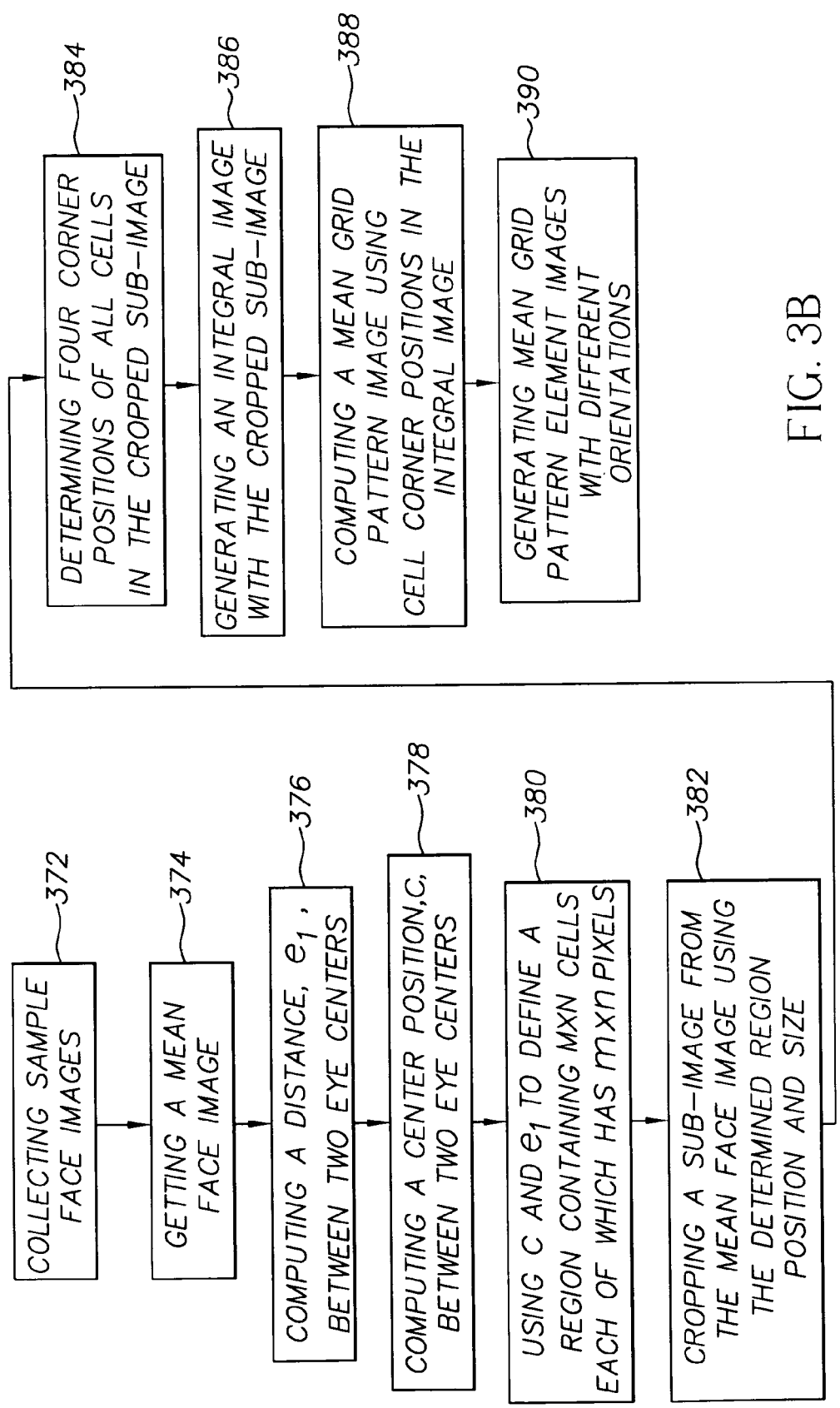
FIG. 3B is a flowchart illustrating a method of regular grid pattern design.
Figure 6:
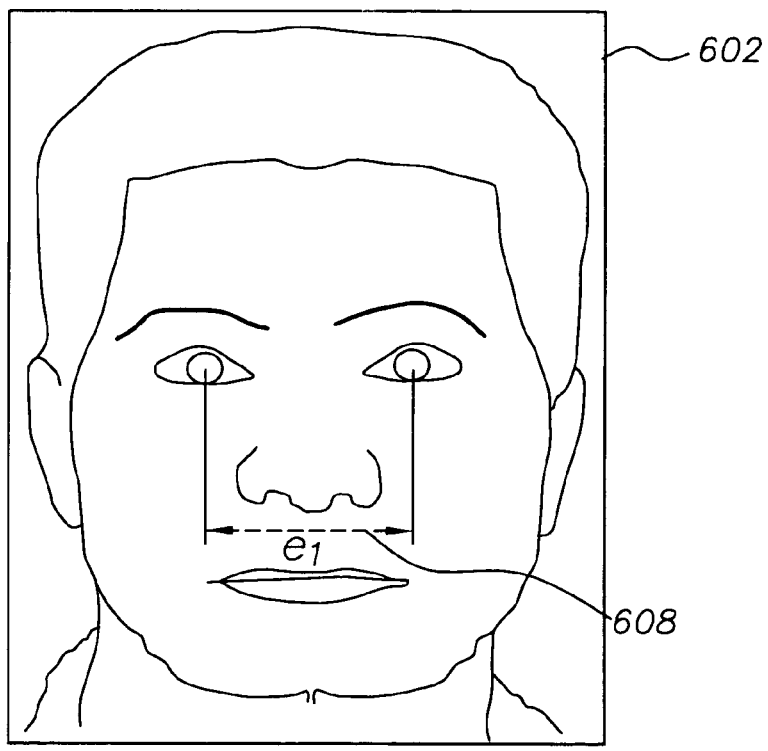
FIG. 6 is an illustration showing key positions for regular grid pattern design.
Figure 7:
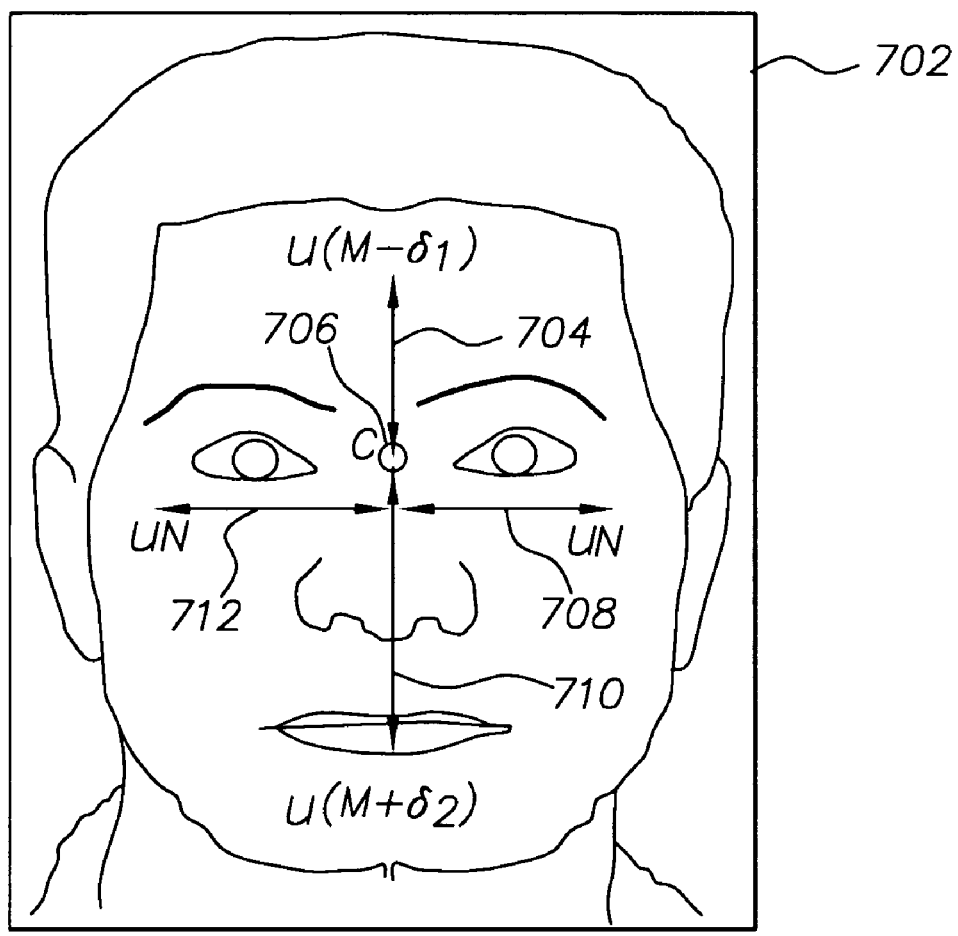
FIG. 7 is an illustration showing position and size parameters for regular grid pattern design.
Figure 8:
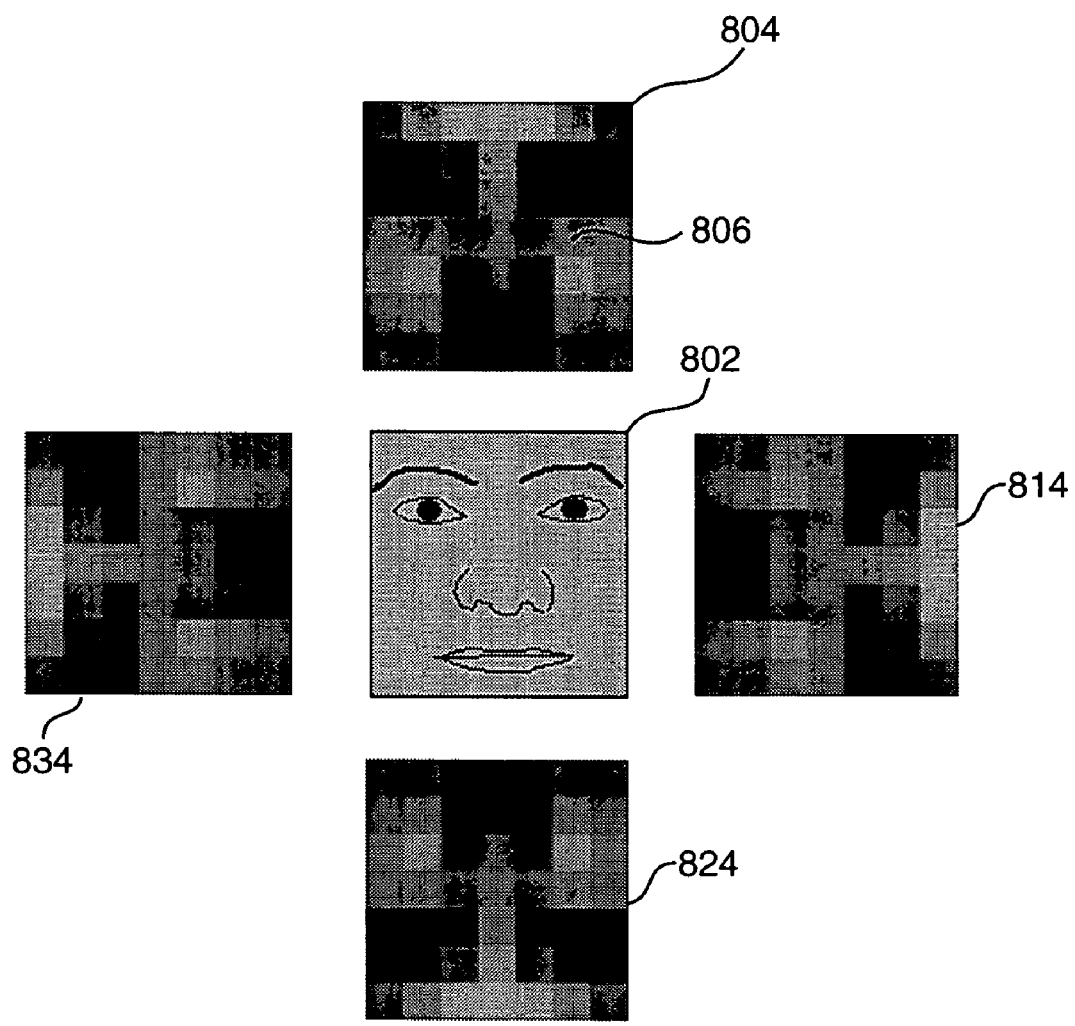
FIG. 8 is an illustration of an intensity face image and its regular grid pattern image with exemplary four orientations.

Referring now to FIG. 3B, there is a flowchart describing design 2 for generating an MGPe image. A first step in design 2 is a step 372 of collecting sample face images in FIG. 3B. A large number of cropped face images are manually collected. In performing a mean face image step 374, a mean face image is obtained by aligning two eyes of all the collected face images and taking an average intensity for every pixel. To generate an MGPe image, grid cell sizes and positions have to be determined. In design 2, all cells have the same size. The design starts at a step 376 of computing a distance $e_1$ (608 in a face image 602 in FIG. 6)

between two eye centers. It then finds the center position c (706 in a face image 702 in FIG. 7) between the two eye centers in a step 378 of computing a center position. The distance $e_1$ (608) and center position c (706) are used in a step 380 of using distance $e_1$ and center position c to define a region containing M×N cells each of which has mxn pixels. Denote a unit distance by u. Let $u=e_1/f$. A preferred value of f is 8. In FIG. 7, starting from the center c (706), there are four arrows (arrow 704, arrow 708, arrow 710 and arrow 712) pointing north, east, south and west respectively. Tips of the arrows define boundaries of a box to be used to crop the mean face image in order to compute the MGPe image. As shown in FIG. 7, the upper boundary is $(M-\delta_1)$ units (u) away from the center c, the lower boundary is $(M+\delta_2)$ units (u) away from the center, left boundary is N units (u) away from the center, and right boundary is N units (u) away from the center. Note that the physical length of unit u depends on the size of the mean face image. An exemplary value for M is 7, for N is 7, for $\delta_1$ is 2, and for $\delta_2$ is 2. In this case, as shown in FIG. 8, the design has square cells (such as cell 806) all having a same size and a square cropping region used in a step 382 of cropping a sub-image (see the cropped sub-image 802 from the mean face image shown in FIG. 8).

For design 2, positions of four corners of a cell 806 can be easily calculated with respect to the upper left corner of the sub-image in a step 384 of determining four corner positions. After getting corner positions for all cells, for design 2, subsequent steps (step 386 of generating an integral image, step 388 of computing a mean grid pattern image and step 390 of generating a mean grid pattern element image) are very much the same as that in design 1.

It is understood again that since the mean grid pattern element (MGPe) image takes only one pixel from each of the cells, statistically, the size of the cropped sub-image (thereby, size of individual cells) should not matter. The MGPe image is simply a statistical measure of main features of a mean face. Practically, an exemplary size for the cropped sub-image for design 2 could be 105×10⁵ with 7×7 cells each of which has 15×15 pixels. Thereby, the mean grid pattern element (MGPe) image has 49 elements.

Before referring back to FIG. 4, the use of the MGPe image needs to be discussed. From the previous discussions, it is known that an MGPe image gathers the statistical information (structural information and intensity information) of a mean face region. To localize a face in an image, a type of measure has to be determined. In the present invention, a statistical correlation coefficient (see *The Statistical Analysis of Time Series* by T. W. Anderson, John Wiley & Sons, Inc, 1994, chapter 6, which is incorporated herein by reference) of two variables is used for classifying faces or non-face objects. The two variables here are a mean grid pattern element (MGPe) image and a grid pattern element (GPe) image of an image under testing. The GPe image should have the same size as the MGPe image.

Denote the MGPe image by $\Phi_0$ and the GPe image by $\Phi_1$. The correlation coefficient between these two variables is $$r=\mu_{11}/\sigma_{\Phi_i}\sigma\Phi_j\|r\|\leq 1 \qquad (4)$$

where $$\mu_{11}=E\{\Phi_i\Phi_j\}-E\{\Phi_i\}E\{\Phi_j\} \qquad (5)$$

$$\sigma^2\Phi_k=E\{(\Phi_k-E\{\Phi_k\})^2\}$$

here E{ } is an expectation operator.

To use the correlation coefficient r as a statistical measure to separate non-face objects and faces, distributions of the correlation coefficients between MPGe of the mean face and GPe of faces and the correlation coefficients between MPGe of the mean face and GPe of non-face objects are inspected.

Figure 9:
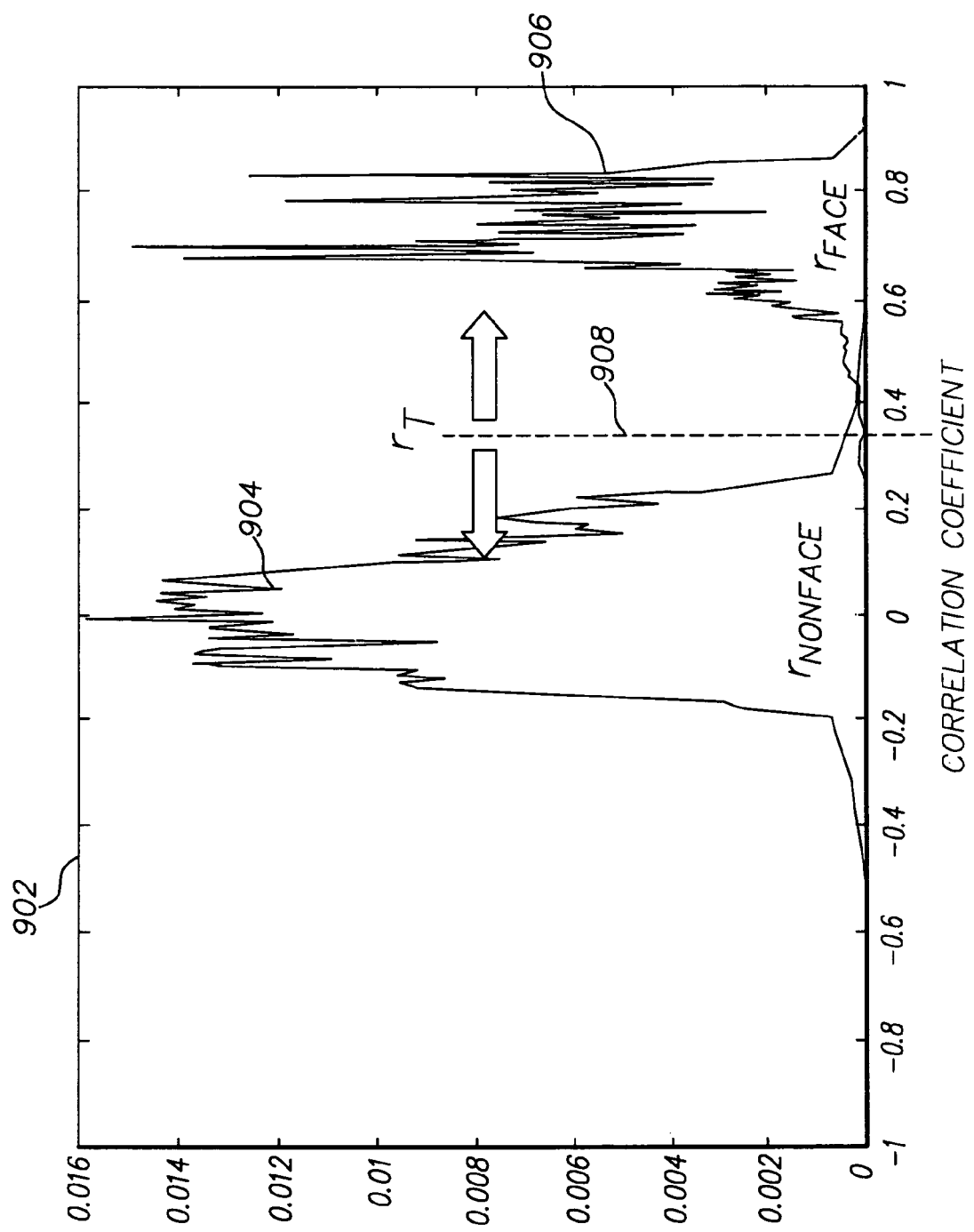
FIG. 9 is a graph illustrating distributions of correlation coefficients for face grid pattern images and the mean face grid pattern image, and non-face grid pattern images and the mean face grid pattern image.
Figure 10:
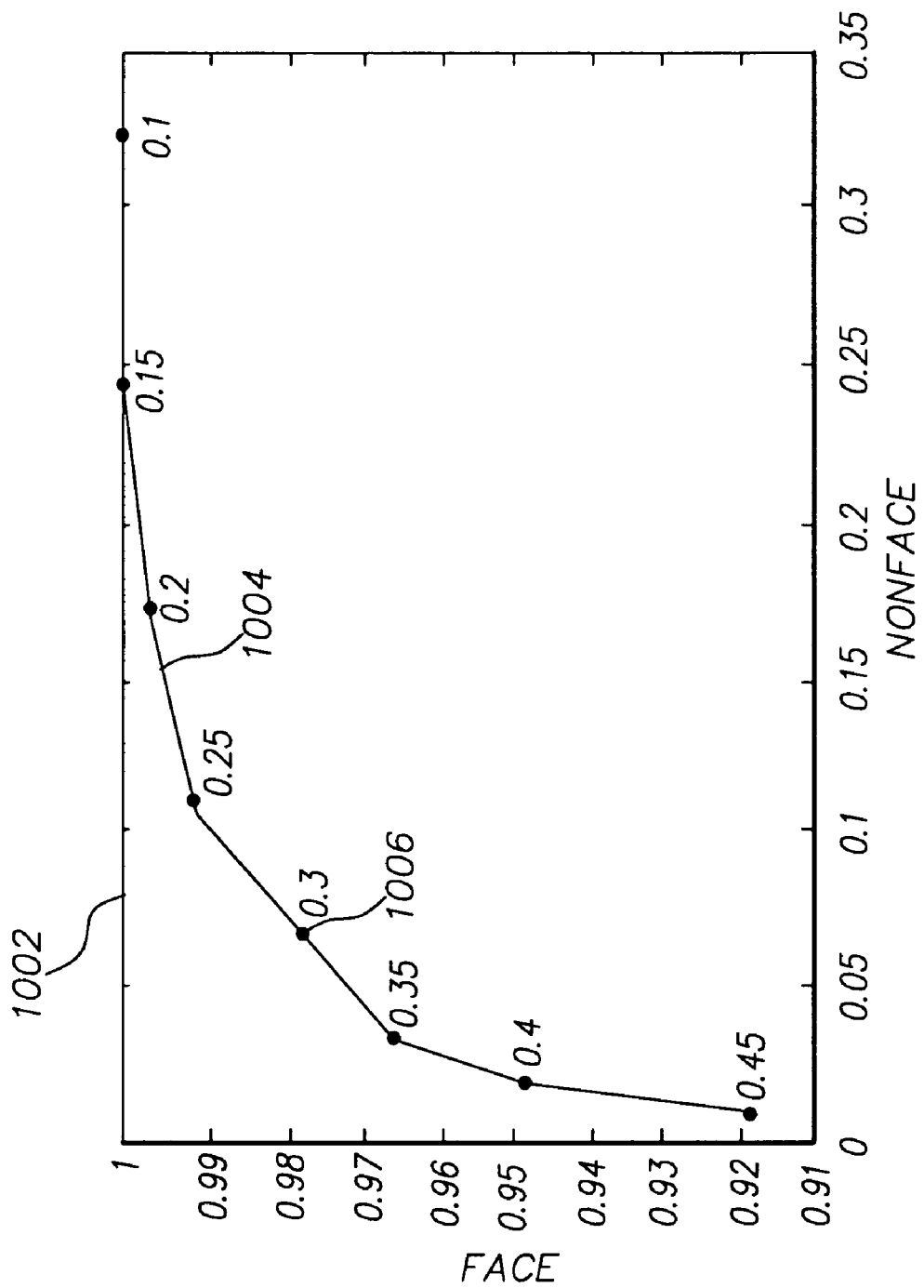
FIG. 10 is a graph illustrating face detection rates and false positive rates as functions of threshold values using the present invention.

A large number of sample faces with a same orientation are used to generate face grid pattern element (GPe) images using the method described in design 2 above (step 376 through step 390 in FIG. 3B). Note that this time, a GPe image is generated for each individual sample face image, not for a mean image. After applying Equation (4) to the MGPe image of the same orientation of the faces and each of the individual face GPe images, a large number of correlation coefficients are produced. An example distribution of these coefficients is depicted in FIG. 9 by a curve 906 in chart 902. Noticeably, for face GPe images, the correlation coefficients are mostly distributed between 0.4 to 1. The same procedures can be applied to a large number of non-face sample images. An example distribution of correlation coefficients between the MGPe image and the non-face GPe images is depicted in FIG. 9 by a curve 904 in chart 902. Noticeably, for non-face GPe images, the correlation coefficients are mostly distributed below 0.4. Therefore, by changing a threshold $r_T$ (908), a balanced true positive (correctly classified face) verses false positive (falsely classified face) performance is achievable. Chart 1002 in FIG. 10 shows a curve 1004 that depicts the performance of true positives verses false positives as a function of the threshold $r_T$ (908). For example, a threshold value 0.3 (1006) confirms approximately 97.8% of the faces from the sample face set, while the same threshold falsely accepts roughly 6.2% of the non-faces from the non-face set as faces.

Now, consider the correlation between MGPe images with different orientations and face GPe images with different orientations. Denote the GPe images with different orientations by $\Phi_1^j$, where $j\epsilon[1,2,3,4]$. For simplicity, denote $r_{ij}=C(\Phi_0^i,\Phi_1^j)$ as the correlation coefficient between two variables $\Phi_0^i$ and $\Phi_1^j$, where $C(\Phi_0^i,\Phi_1^j)$ is evaluated using Equations (3) and (4).

Figure 14:
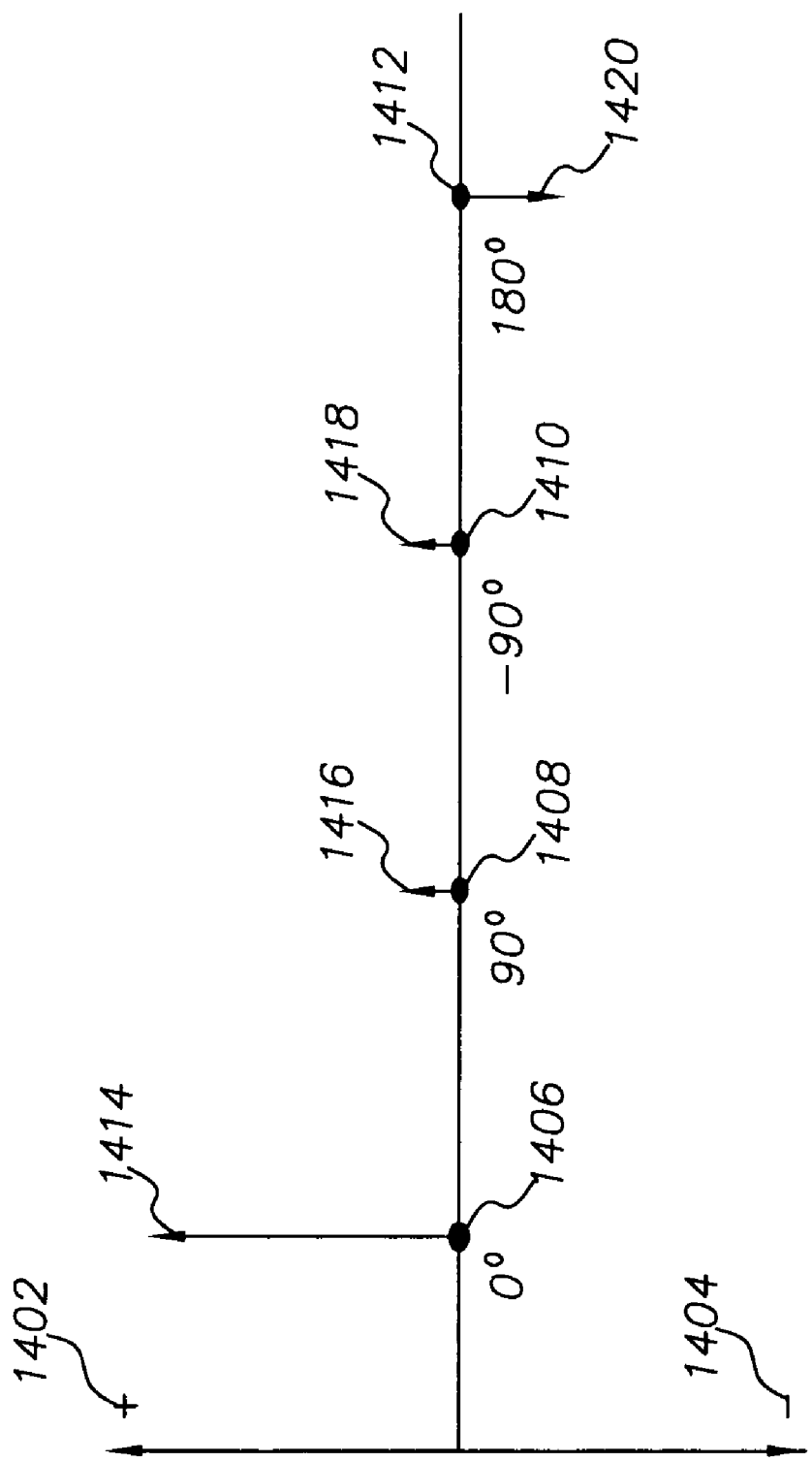
FIG. 14 is a chart useful in illustrating the outcomes of exemplary orientation differences between a face grid pattern image and a mean grid pattern image.
Figure 15:
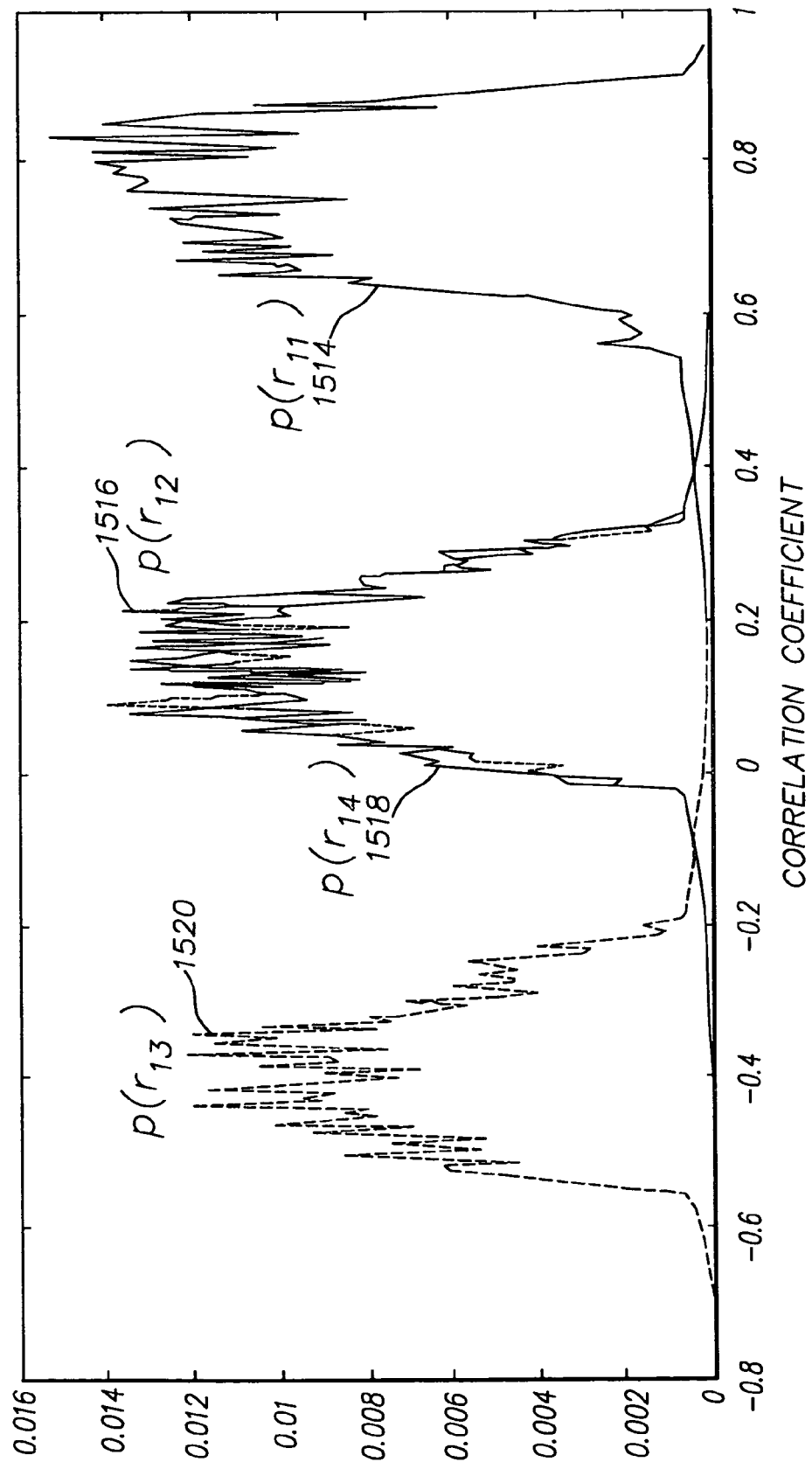
FIG. 15 is an illustration of distributions of correlation coefficients for face grid pattern images and mean face grid pattern images having four different orientations.

Exemplary $r_{ij}$ distributions, $p(r_{ij})$, are shown in FIG. 15. $p(r_{11})$ is the correlation coefficient distribution between $\Phi_0^1$ and $\Phi_1^1$ images. As expected, distribution $p(r_{11})$ (1514) mostly locates close to positive 1, since the testing GPe images and the MGPe image have the same orientation. While distributions $p(r_{12})$, $p(r_{13})$, and $p(r_{14})$ locate away from positive 1, because $\Phi_1^2$ images, $\Phi_1^3$ images, and $\Phi_1^4$ images are not in the same orientation as $\Phi_0^1$, and they are treated as non-faces by $\Phi_0^1$. Generally speaking, in terms of probability, $r_{kk}>r_{ij|i\neq j}$ for any given orientation. This property makes image orientation determination possible. To summarize, with the four exemplary orientations, if given a $\Phi_0^i$ (in any one of the four orientations) and a $\Phi_1^j$ (in any one of the four orientations), the resultant $r_{ij}$ of a correlation operation has any one of the four outcomes 1414, 1416, 1418 and 1420 in FIG. 14. Outcome 1414 has relatively a higher positive mean value when the two operands of the correlation operation $C(\Phi_0^i,\Phi_1^j)$ are aligned (0° difference indicated by dot 1406). Outcomes 1416 and 1418 have a near zero positive mean value when the two operands of the correlation operation $C(\Phi_0^i,\Phi_1^j)$ are misaligned (90° or −90° difference indicated by dot 1408 and 1410). Outcome 1420 has relatively a higher negative mean value when the two operands of the correlation operation $C(\Phi_0^i,\Phi_1^j)$ are misaligned (180° difference indicated by dot 1412).

Referring back to FIG. 4B, the grid pattern test 206 (440) is detailed by a series of steps, i.e., from a step 414 of cropping a sub-image to a query 3 (430).

Recall that the parameters used in the cropping a sub-image step 414 are generated in a forming parameters sets list step 412. A set of parameters contains a width, a height, and positions of an upper left corner of a rectangular box. The width of the box is a maximum width of a cluster retained in the geometry test 204, and the height of the box is a maximum height of a cluster retained in the geometry test 204. An example of such a box is a box 1248 shown in FIG. 12. The positions of the upper left corner of the box are defined with respect to the upper left corner of the binary image 1242. It should be understood that these parameters are re-scaled to fit the original image size before they are used to crop a sub-image from the gray scale image in the step 414 of cropping a sub-image step.

Figure 12D:
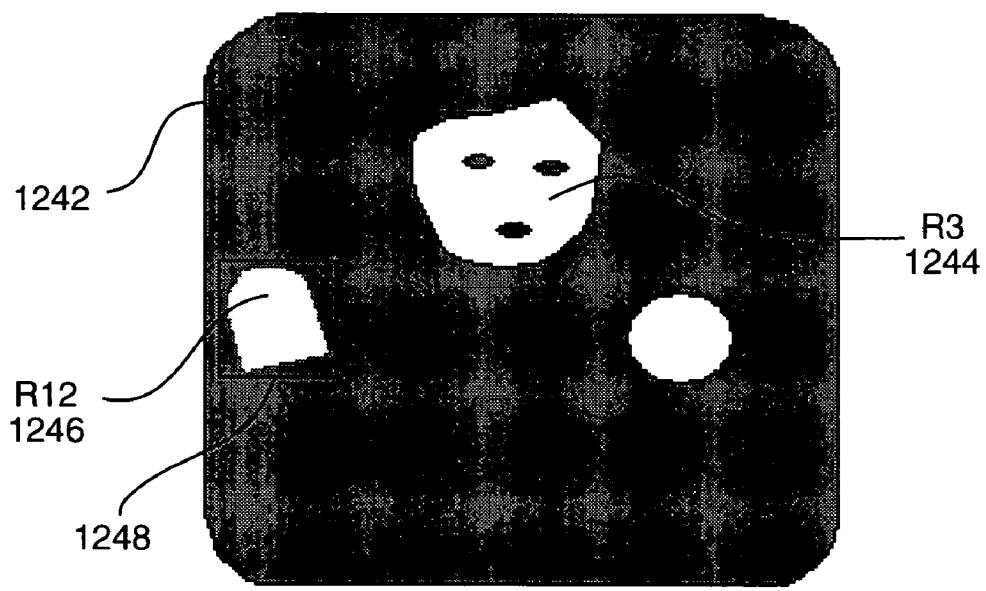

For each set of parameters from the list, a sub-image is cropped from a gray image obtained from a step 411 of converting the gray image. Notice that this gray image has all but pixels retained in the step 410 of erasing unwanted clusters set to black. Remember, parameters from step 410 have to be rescaled before they can used in step 411. Referring to FIG. 12D, the gray image may have objects such as shown in example image 1242. An example set of parameters may crop a sub-image having the same size as box 1248. This sub-image has a cluster such as R12 (1246). This cluster has gray scale pixels. Pixels outside the cluster are black. With this sub-image, a corresponding integral image can be computed in a step 416 of computing an integral image.

In a cropped sub-image, if there are any faces, their sizes are unknown. Therefore, the cropped sub-image of the digital color image must be evaluated at a plurality of effective resolutions, which is done by reducing the cropped sub-image to a plurality of grid pattern element images (GPe images) at different effective resolutions and then correlating the MGPe image with the GPe image at each resolution. So, the search of faces starts with a maximum possible cell size (see a step 418 of starting from an adequate grid pattern cell size) and continues all the way down to a minimum allowable cell size (see query 2 (428)). Suppose a 7×7 grid pattern element image (see grid pattern 804 in FIG. 8 as an example) format is used for the face detection. And suppose the cropped sub-image has a size of 70×70 pixels. The maximum possible cell size is 10×10 pixels in this case (given a 7×7 grid pattern). The minimum allowable cell size is predefined. An exemplary minimum allowable cell size is 2×2 pixels. With this 70×70 sub-image, only one search can be conducted for a cell size of 10×10 pixels. That is because a 7×7 grid pattern element image needs a 70×70 pixel region to support cells having a size of 10×10 pixels, i.e., there is only one search position for the 7×7 grid pattern element image in the 70×70 pixel region. In contrast, a 7×7 grid pattern element image only needs a 14×14 pixel region to support cells having a size of 2×2 pixels; consequently there are many possible different search placements of the resulting 7×7 pattern in the 70×70 pixel region. In practice, the 14×14 support region will be stepped through the 70×70 sub-image to cover all the possible grid pattern positions, and there will be 3249 searches for the minimum allowable cell size, that is, if the search step size is 1. There also can be a predefined maximum allowable cell size. An exemplary maximum allowable cell size is 25×25 pixels. The difference between two consecutive cell sizes can be determined by a predefined scale factor. An exemplary scale factor could be $2^{1/8}$.

The grid pattern test basically correlates a set of MGPe images with different orientations to a GPe image obtained from the test image. (Alternatively, the different orientations may be applied to the grid pattern element (GPe) image for purpose of the test rather than to the mean grid pattern element (MGPe) image, i.e., the grid pattern test may correlate an MGPe image to a set of GPe images with different orientations, as initially obtained (at an initial orientation) from the test image.) Recall that there are two types of MGPe. An irregular MGPe image (from design 1) and a regular MGPe image (from design 2).

If an irregular MPGe image is selected, starting with maximum possible cell sizes, a step 420 of scanning the current sub-image crops a patch of the integral image computed from the cropped sub-image in step 416. In a step 482, which involves choosing an orientation, selecting a mean grid pattern element image and computing a grid pattern element image of the scanned area using the integral image, an irregular type MGPe image with a certain orientation is selected first. Then, the cropped patch of the integral image is used to compute an irregular type grid pattern element (GPe) image with the same orientation. (As mentioned above, the same test could be applied but with the selected orientations obtained from different orientations of the grid pattern element image instead of the mean grid pattern element image.) In a step 422 of grid pattern testing, a test is performed to see if a patch of the sub-image corresponding to the cropped integral image patch represents a face by evaluating a correlation coefficient of the GPe image and the MGPe image. If the GPe image computed from the cropped integral image patch passes the grid pattern test (that is, the correlation coefficient is greater than a predefined threshold $r_T$ (908)), the position and size parameters (denoted by P) of the current patch along with the orientation index (denoted by $o^i$, i∈[1,2,3,4]) and correlation coefficient r are added into face-like pattern object candidates list in a step 424 of condition checking.

If a regular grid pattern is selected, starting with a maximum possible cell size, a step 420 of scanning the current sub-image crops a patch of the integral image computed from the cropped sub-image in step 416. In the step 420 of choosing an orientation, selecting a mean grid pattern element image and computing a grid pattern element image of the scanned area using the integral image, a regular type MGPe image with a certain orientation is selected first. Then, the cropped patch of the integral image is used to compute a regular type grid pattern element (GPe) image. (As mentioned above, the same test could be applied but with the selected orientations obtained from different orientations of the grid pattern element image instead of the mean grid pattern element image.) In the step 422 of grid pattern testing, a test is performed to see if a patch of the sub-image corresponding to the cropped GPe image patch represents a face by evaluating a correlation coefficient of the GPe image and the MGPe image. If the GPe image patch cropped from the GPe image passes the grid pattern test (that is, the correlation coefficient is greater than a predefined threshold, $r_T$ (908)), the position and size parameters (denoted by P) of the current patch along with the orientation index (denoted by $o^i$, i∈[1,2,3,4]) and correlation coefficient r are added into a face-like pattern object candidates list in a step 424 of condition checking.

The above described grid pattern test is performed for all orientations (see query 0 (484)), for all areas within a cropped sub-image (see query 1 (426)), for all adequate cell sizes (see query 2 (428)), and for all parameter sets (see query 3 (430)).

Notice that for every sub-image (such as the one cropped by box 1248) there is a limit N on the number of face-like pattern object candidates that can be added to the list. An exemplary value for the limit N is 10. The list is first filled with N candidates and rank ordered according to their correlation coefficient (r) values. The candidate having the highest r is arranged at the top of the list. Any subsequent qualified candidate (with $r \geq r_T$) is compared with the candidates that are already in the list. If the correlation coefficient value of the new candidate is lower than the candidate at the bottom of the list, the new candidate is discarded. Otherwise, the new candidate will be inserted to the list and the candidate at the bottom of the list will be pushed out from the list. The actual number of qualified candidates in a list is usually equal to or less than N. The maximum number of qualified candidates for an image, $\tilde{N}$, is nN, where n is the number of cropped sub-images.

Figure 13:
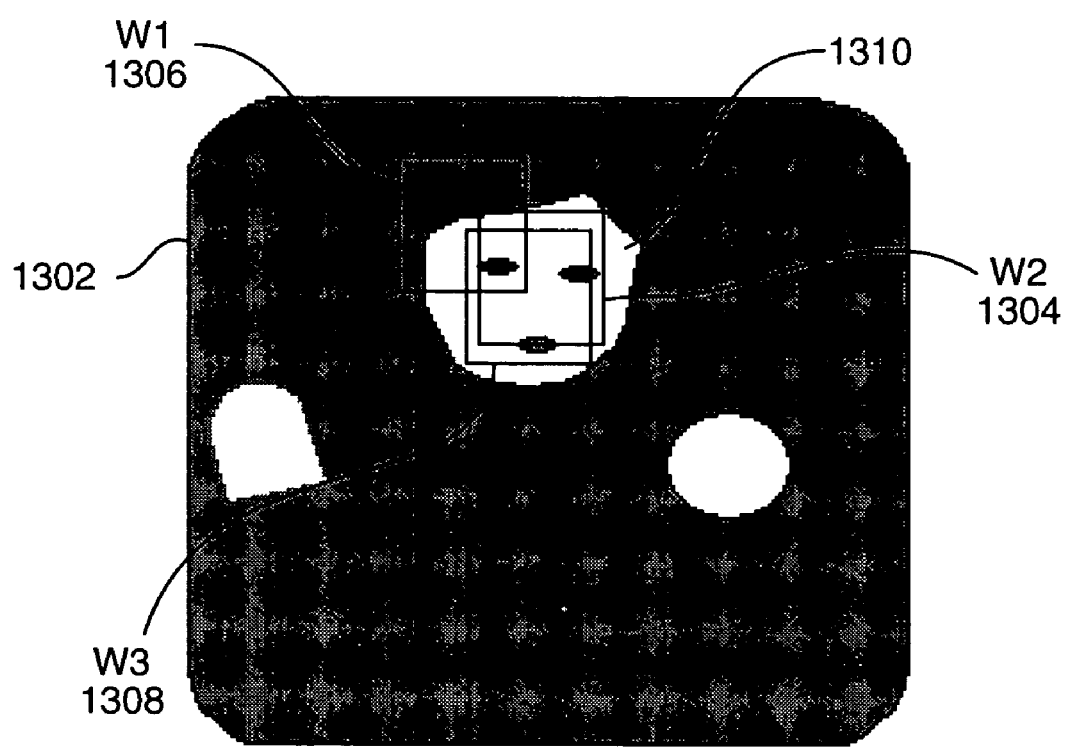
FIG. 13 is an illustration useful in describing a location test and post-test processing.

After having a list of $\tilde{N}$ face candidates, a step of location testing 432 tests the face candidate areas defined by the stored parameters. This testing removes a set of parameters from the face candidates list if the area defined by the set of parameters contains less than a predefined percentage of a cluster retained in step 410. An exemplary candidate to be removed is shown in FIG. 13. Candidate W1 (1306) partially covers a face area, so it is removed from the candidate list. The final number of face-like pattern object candidates, $\hat{N}$, is equal to or less than $\tilde{N}$.

In order to determine the image orientation, a statistical method may be employed in an image orientation determination stage 220 (also 486). An x % of the $\hat{N}$ number of candidates are picked for analysis. The x % $\hat{N}$ candidates are the ones having higher r values than all the rest (1–x %) $\hat{N}$ candidates. An exemplary x value would be 10. The image orientation is determined calling a vote among the x % $\hat{N}$ most powerful candidates. The majority wins. If there is a tie, the most powerful candidate sets the orientation.

A final step of post-test processing 434 updates the face candidates parameters list revised in step 432 by merging neighboring candidates based on a distance measure of the centers of the candidate areas. Exemplary candidates W2 (1304) and W3 (1308) in FIG. 13 are close to each other, so they are to be merged. An exemplary distance measure is a Euclidean distance of one half of the average of the box (candidate areas) heights. For an image there may be M merged candidates, where $M \leq \hat{N}$ in general.

The subject matter of the present invention relates to digital image understanding technology, which is understood to mean technology that digitally processes a digital image to recognize and thereby assign useful meaning to human understandable objects, attributes or conditions, and then to utilize the results obtained in the further processing of the digital image.

The invention has been described with reference to a preferred embodiment. However, it will be appreciated that variations and modifications can be effected by a person of ordinary skill in the art without departing from the scope of the invention.

PARTS LIST 100 image source
102 image processor
104 image display
106 keyboard
107 computer readable storage medium
108 mouse
109 output device
202 chromaticity test
204 geometry test
206 grid pattern
208 location test
210 post-test processing
212 mean grid pattern element image generator
220 orientation determination stage
304 collecting sample face images step
306 getting a mean face image step
308 determining individual cells step
310 determining a region containing all cells step
312 cropping a sub-image step
314 determining four corner positions step
316 generating an integral image step
318 computing a mean grid pattern image step
320 generating a mean grid pattern element image step
372 collecting sample face images step
374 mean face image step
376 computing an eye center distance step
378 computing an eye center position step
380 region defining step
382 cropping a sub-image step
384 determining four corner positions step
386 generating an integral image step
388 computing a mean grid pattern image step
390 generating a mean grid pattern element image step
402 resizing image down step
404 erasing non-skin-color pixels step
406 clustering remaining pixels into regions step
408 morphological processing step
410 erasing unwanted regions step
411 converting to gray image step
412 forming a parameters sets list step
414 cropping a sub-image step
416 computing an integral image step
418 adequate grid pattern cell size step
420 scanning the current sub-image step
422 grid pattern testing step
424 condition checking step
426 query 1
428 query 2
430 query 3
432 location testing step
434 post-test processing
440 grid pattern test
482 select an orientation step
484 query 0
486 orientation determination step
502 face image
504 upper right corner dot
506 cell
508 cluster boundary
602 face image
608 distance
702 face image
704 distance
706 center position
708 distance
710 distance
712 distance
802 face intensity image
804 face M×N grid pattern image
806 grid cell
814 face M×N grid pattern image
824 face M×N grid pattern image
834 face M×N grid pattern image
902 chart
904 distribution curve
906 distribution curve
908 threshold
1002 chart
1004 curve 1006 number
1102 mean face image
1104 region
1106 corner position
1108 corner position
1110 corner position
1112 corner position
1114 corner position
1116 cell
1120 pixel
1122 integral image
1126 pixel
1128 position
1130 position
1132 position
1134 position
1202 intensity color image
1212 first binary image
1216 cluster R1
1218 cluster R2
1220 cluster R3
1232 second binary image
1234 cluster R11
1236 cluster R12
1238 cluster R2
1240 cluster R4
1242 third binary image
1244 cluster R3
1246 cluster R12
1248 box
1302 fourth binary image
1304 box W2
1306 box W1
1308 box W3
1310 cluster R3
1406 0 degree position
1408 90 degree position
1410 −90 degree position
1412 180 degree position
1414 arrow
1416 arrow
1418 arrow
1420 arrow
1514 distribution curve
1516 distribution curve
1518 distribution curve
1520 distribution curve

What is claimed is:

1. A digital image processing method for locating faces in a digital image, comprising the steps of:
generating an integral image from the digital image;
generating a grid pattern image from said integral image, said grid pattern image having a grid pattern having a plurality of cells each of said cells having a plurality of pixels;
reducing said grid pattern image to a corresponding base grid pattern element image, said base grid pattern element image having a number of pixels equal to the number of cells in said grid pattern image;
providing a set of different orientation images, said set including a selected one of said base grid pattern element image and a predetermined mean grid pattern element image of sample face images and excluding the other of said base grid pattern element image and said mean grid pattern element image, said set also including a plurality of additional grid pattern element images, each said additional grid pattern element image being a different rearrangement of elements of the selected one of said base grid pattern element image and said mean grid pattern element image; and
performing a correlation test between said images of said set of different orientation images and said excluded one of said base grid pattern element image and said mean grid pattern element image.

2. The method of claim 1 wherein said digital image is a digital color image.

3. The method claimed in claim 1 wherein said generating an integral image step further comprises:
cropping a sub-image from said digital color image; and
computing said integral image from said sub-image.

4. The method claimed in claim 3 wherein said grid pattern has a first cell size and the method further comprises iterating said generating of said grid pattern image, said reducing, and said performing steps with each of a plurality of additional grid patterns, said grid patterns all having different cell sizes.

5. The method claimed in claim 4 wherein said digital image has a plurality of different areas, said sub-image is of one of said areas; and the method further comprises repeating said generating, generating, reducing, providing, performing, and iterating steps on a plurality of different additional sub-images of said digital image.

6. The method claimed in claim 1 further comprising prior to said generating steps:
generating a mean face image from a collection of sample face images;
generating a mean integral image from the mean face image;
generating a mean grid pattern image from said mean integral image, said mean grid pattern image having a plurality of cells in said grid pattern; and
reducing said mean grid pattern image to a corresponding mean grid pattern element image, said mean grid pattern element image having a number of pixels equal to the number of cells in said mean grid pattern image.

7. The method claimed in claim 6 wherein said base grid pattern element image and said mean grid pattern element image are one-dimensional.

8. The method as claimed in claim 6, wherein said method further comprises the step of selecting an irregular grid pattern, wherein said irregular grid pattern has a plurality of different size grid cells that cover major features including at least one of eyes, nose, mouth, forehead, and cheek of the mean face image.

9. The method claimed in claim 1, wherein the grid pattern is regular.

10. The method claimed in claim 1, wherein the grid pattern is irregular.

11. A computer program product stored on a computer readable medium for performing the method of claim 1.

12. A digital image processing method for locating faces in a digital image, comprising the steps of:
generating an integral image from the digital image;
generating a grid pattern image from said integral image, said grid pattern image having a grid pattern having a plurality of cells each of said cells having a plurality of pixels;
reducing said grid pattern image to a corresponding base grid pattern element image, said base grid pattern element image having a number of pixels equal to the number of cells in said grid pattern image;
providing a set of different orientation images, said set including said base grid pattern element image and a plurality of additional grid pattern element images, each said additional grid pattern element image being a different rearrangement of elements of said base grid pattern element image; and performing a correlation test between said images of said set of different orientation images and said mean grid pattern element image.

13. The method of claim 12 wherein said providing further comprises generating said additional grid pattern element images from said base grid pattern element image.

14. The method claimed in claim 12 wherein said generating an integral image step further comprises:
cropping a sub-image from said digital color image; and
computing said integral image from said sub-image.

15. The method claimed in claim 14 wherein said grid pattern has a first cell size and the method further comprises iterating said generating of said grid pattern image, said reducing, and said performing steps with each of a plurality of additional grid patterns, said grid patterns all having different cell sizes.

16. The method claimed in claim 15 wherein said digital color image has a plurality of different areas, said sub-image is of one of said areas; and the method further comprises repeating said generating, generating, reducing, providing, performing, and iterating steps on a plurality of different additional sub-images of said digital color image.

17. The method claimed in claim 12 further comprising prior to said generating steps:
generating a mean face image from a collection of sample face images;
generating a mean integral image from the mean face image;
generating a mean grid pattern image from said mean integral image, said mean grid pattern image having a plurality of cells in said grid pattern; and
reducing said mean grid pattern image to a corresponding mean grid pattern element image, said mean grid pattern element image having a number of pixels equal to the number of cells in said mean grid pattern image.

18. A computer program product stored on a computer readable medium for performing the method of claim 12.

19. A digital image processing method for locating faces in a digital image, comprising the steps of:
generating an integral image from the digital image;
generating a grid pattern image from said integral image, said grid pattern image having a grid pattern having a plurality of cells each of said cells having a plurality of pixels;
reducing said grid pattern image to a corresponding base grid pattern element image, said base grid pattern element image having a number of pixels equal to the number of cells in said grid pattern image;
providing a set of different orientation images, said set including a predetermined mean grid pattern element image of sample face images and a plurality of additional grid pattern element images, each said additional grid pattern element image being a different rearrangement of elements of said mean grid pattern element image; and
performing a correlation test between said images of said set of different orientation images and said base grid pattern element image.

20. The method claimed in claim 19 wherein said generating an integral image step further comprises:
cropping a sub-image from said digital color image; and
computing said integral image from said sub-image.

21. The method claimed in claim 20 wherein said grid pattern has a first cell size and the method further comprises iterating said generating of said grid pattern image, said reducing, and said performing steps with each of a plurality of additional grid patterns, said grid patterns all having different cell sizes.

22. The method claimed in claim 21 wherein said digital image has a plurality of different areas, said sub-image is of one of said areas; and the method further comprises repeating said generating, generating, reducing, providing, performing, and iterating steps on a plurality of different additional sub-images of said digital image.

23. The method claimed in claim 19 further comprising prior to said generating steps:
generating a mean face image from a collection of sample face images;
generating a mean integral image from the mean face image;
generating a mean grid pattern image from said mean integral image, said mean grid pattern image having a plurality of cells in said grid pattern; and
reducing said mean grid pattern image to a corresponding mean grid pattern element image, said mean grid pattern element image having a number of pixels equal to the number of cells in said mean grid pattern image.

24. A computer program product for performing the method of claim 19.

25. A digital image processing method for determining orientation of faces located in a digital color image, comprising the steps of:
a) generating a mean grid pattern element image from a plurality of sample face images;
b) generating an integral image from the digital color image;
c) locating a face in the color digital image by using the integral image to perform a correlation test between the mean grid pattern element image and the digital color image at a plurality of effective resolutions by reducing the digital color image to a plurality of grid pattern element images at different effective resolutions and correlating the mean grid pattern element image with the plurality of grid pattern element images, whereby either the mean grid pattern element image or the grid pattern element images are provided at a plurality of different orientations; and
d) determining an orientation of the face in the color digital image by using the images with different orientations in the correlation test of step c);
wherein the step a) of generating a mean grid pattern element image comprises the steps of:
a1) collecting sample face images;
a2) generating a mean face image from the sample face images;
a3) selecting a regular grid pattern;
a4) reducing the resolution of the mean face image to the resolution of the selected grid pattern by averaging; and
a5) generating mean grid pattern element images with different orientations by rearranging the order of the elements; and
wherein the step of selecting a regular grid pattern comprises computing a distance between two eye centers of the mean face image; computing a center position between the two eye centers; and using the distance and position to determine M and N dimensions and a position of a region wherein said region contains M by N grid cells with each cell having m by n pixels.

26. A digital image processing method for determining orientation of faces located in a digital color image, comprising the steps of:

a) generating a mean grid pattern element image from a plurality of sample face images;
b) generating an integral image from the digital color image;
c) locating a face in the color digital image by using the integral image to perform a correlation test between the mean grid pattern element image and the digital color image at a plurality of effective resolutions by reducing the digital color image to a plurality of grid pattern element images at different effective resolutions and correlating the mean grid pattern element image with the plurality of grid pattern element images, whereby either the mean grid pattern element image or the grid pattern element images are provided at a plurality of different orientations; and
d) determining an orientation of the face in the color digital image by using the images with different orientations in the correlation test of step c);
wherein the step b) of generating an integral image further comprises the steps of:
b1) replacing non-skin color pixels in the digital color image with black to produce an image having skin color pixels;
b2) replacing non-face shaped clusters of pixels with black to produce an image having skin colored and face shaped clusters;
b3) labeling skin colored and face shaped clusters as face clusters; and
b4) generating the integral image from each labeled face cluster of the image.

27. The method claimed in claim 26, further comprising the steps of:
eliminating face clusters that contain more than a predetermined percentage of black pixels; and
merging face clusters that substantially overlap.

28. The method claimed in claim 26, wherein the step of replacing non face shaped clusters comprises the steps of:
clustering skin-color pixels in the image into clusters;
applying morphological opening and closing processes to the skin-colored pixel clusters; and
replacing the pixels of a cluster with black if they do not meet a geometrical criterion for a face, thereby resulting in a processed image; and wherein the step of labeling skin colored clusters comprises the step of generating a linked list of sets of parameters including a starting position, width, and height, that defines regions containing a cluster of skin-colored pixels.

29. A digital image processing method for determining orientation of faces located in a digital color image, comprising the steps of:
generating a mean grid pattern element image from a plurality of sample face images;
generating an integral image from the digital color image;
locating a face in the color digital image by using the integral image to perform a correlation test between the mean grid pattern element image and the digital color image at a plurality of effective resolutions by reducing the digital color image to a plurality of grid pattern element images at different effective resolutions and correlating the mean grid pattern element image with the plurality of grid pattern element images, whereby either the mean grid pattern element image or the grid pattern element images are provided at a plurality of different orientations; and
determining an orientation index of the face in the color digital image by using the images with different orientations in the correlation test of step c);
repeating said generating, generating, locating, and determining steps to provide a plurality of faces;
wherein said determining step further comprises the steps of:
rank ordering the orientation indicies associated with the faces;
determining the image orientation by applying an order statistics analysis to the rank ordered orientation indices associated with the faces; and
determining the image orientation by voting using a top few of the orientation indices.

* * * * *